United States Patent
Trainin

(10) Patent No.: US 9,680,546 B2
(45) Date of Patent: Jun. 13, 2017

(54) APPARATUS, SYSTEM AND METHOD OF WIRELESS COMMUNICATION BEAMFORMING

(71) Applicant: Intel Corporation, Santa Clara, CA (US)

(72) Inventor: Solomon B. Trainin, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 393 days.

(21) Appl. No.: 14/129,304

(22) PCT Filed: Sep. 8, 2013

(86) PCT No.: PCT/US2013/058660
§ 371 (c)(1),
(2) Date: Dec. 26, 2013

(87) PCT Pub. No.: WO2015/034527
PCT Pub. Date: Mar. 12, 2015

(65) Prior Publication Data
US 2015/0071185 A1 Mar. 12, 2015

(51) Int. Cl.
*H04B 7/08* (2006.01)
*H04B 7/06* (2006.01)

(52) U.S. Cl.
CPC ........... *H04B 7/0617* (2013.01); *H04B 7/063* (2013.01); *H04B 7/0682* (2013.01)

(58) Field of Classification Search
None
See application file for complete search history.

(56) References Cited

U.S. PATENT DOCUMENTS 8,509,130 B2* 8/2013 Liu ................... H04B 7/0695
 342/367
2007/0232235 A1* 10/2007 Li ........................ H04W 28/18
 455/63.1

(Continued)

FOREIGN PATENT DOCUMENTS

JP 2012501591 1/2012

OTHER PUBLICATIONS

Wireless Gigabit Alliance (WGA) Specifications; WiGig MAC and PHY Specification Version 1.1, Apr. 2011—Final Specification; 442 pages.

(Continued)

*Primary Examiner* — Hassan Phillips
*Assistant Examiner* — Ayanah George
(74) *Attorney, Agent, or Firm* — Shichrur & Co.

(57) ABSTRACT

Some demonstrative embodiments include apparatuses, systems and/or methods of wireless communication beamforming. For example, an apparatus may include a wireless communication unit to process a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

21 Claims, 8 Drawing Sheets

(56) References Cited

U.S. PATENT DOCUMENTS

| | | | |
|---|---|---|---|
| 2008/0218413 A1* | 9/2008 | Li ........................... | H04B 7/04 342/367 |
| 2009/0233635 A1 | 9/2009 | Li et al. | |
| 2010/0054223 A1 | 3/2010 | Zhang et al. | |
| 2010/0056062 A1* | 3/2010 | Zhang .................. | H04B 7/0617 455/63.1 |
| 2010/0103045 A1* | 4/2010 | Liu ...................... | H04B 7/0617 342/372 |
| 2010/0164805 A1 | 7/2010 | Niu et al. | |
| 2011/0069688 A1* | 3/2011 | Zhang .................. | H04L 1/0083 370/338 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Wi-Fi Alliance Technical Committee P2P Task Group; Wi-Fi Peer-to-Peer (P2P) Technical Specification; Version 1.2; Dec. 14, 2011; 160 pages.

Hongning Dai et al., "An Overview of MAC Protocols with Directional Antennas in Wireless ad hoc Networks", 8 pages.

International Search Report and Written Opinion for PCT Patent Application No. PCT/US2013/058660, mailed on Jun. 20, 2014, 15 pages.

International Preliminary Report on Patentability for PCT/US2013/058660, mailed on Mar. 17, 2016, 11 pages.

Office Action for Australian Patent Application No. 2013399590, mailed on Aug. 8, 2016, 3 pages.

Office Action for Japanese Patent Application No. 2016-531597. mailed on Mar. 7, 2017, 9 pages (Including 5 pages of English translation).

* cited by examiner

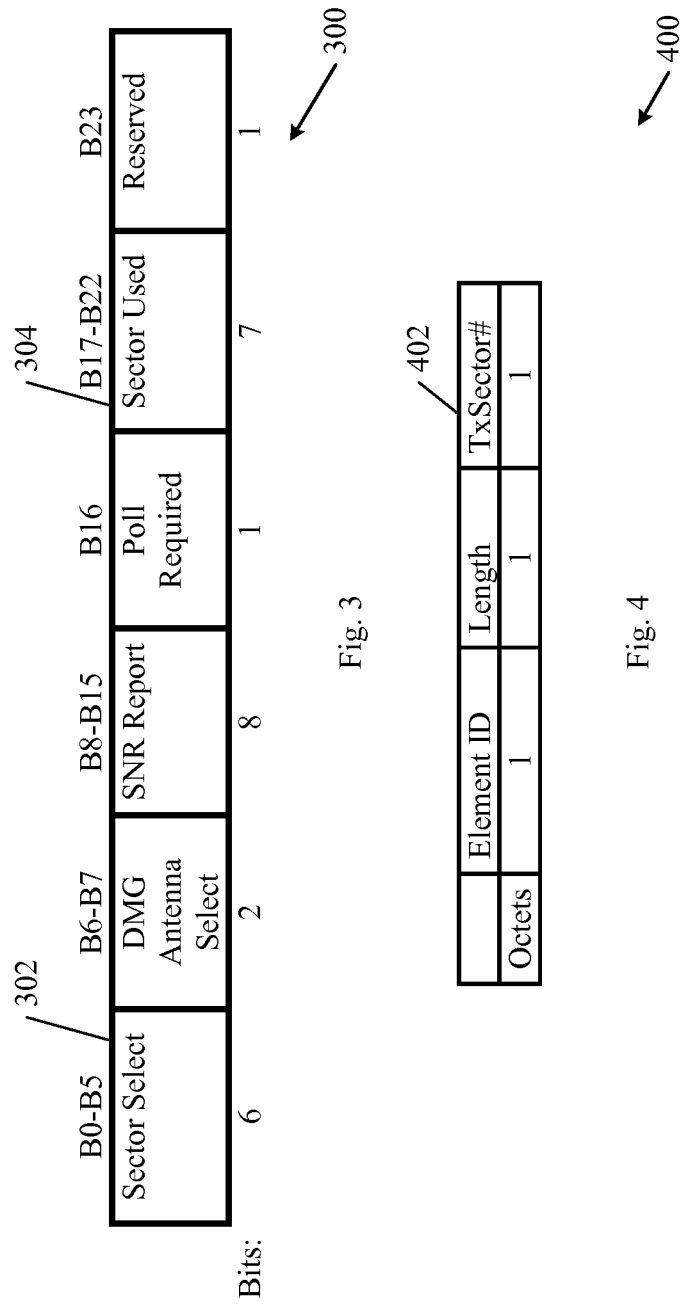

US 9,680,546 B2

APPARATUS, SYSTEM AND METHOD OF WIRELESS COMMUNICATION BEAMFORMING

CROSS REFERENCE

This application is a National Phase Application of PCT International Application No. PCT/US2013/058660, International Filing Date Sep. 8, 2013, the entire disclosure of which is incorporated herein by reference.

BACKGROUND

Some wireless communication devices may utilize directive antennas to communicate over beamformed links. The use of beamformed links may enable establishing several beamformed links over a common wireless communication channel.

The use of the beamformed links may enable improved spectral efficiency, for example, over wireless communication frequency bands, which include a reduced number of independent frequency channels. In one example, the spectrum of the 60 Gigahertz (GHz) frequency band, which is used to exploit Wireless Local Area Network (WLAN) communications, includes up to four independent channels.

However, a limited number of frequency channels may not allow providing a separate channel for each group of communicating devices and, hence, efficient utilization of each frequency channel may be crucial.

Some environments, for example, enterprise environments, may be characterized by a high density of devices. Such environments may suffer from increased interference between devices sharing the same channel, e.g., even if beamformed links are used.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a sector sweep (SSW) feedback field, in accordance with some demonstrative embodiments.

FIG. 4 is a schematic illustration of a Transmit (Tx) sector information element (IE), in accordance with some demonstrative embodiments.

DETAILED DESCRIPTION

Figure 1:
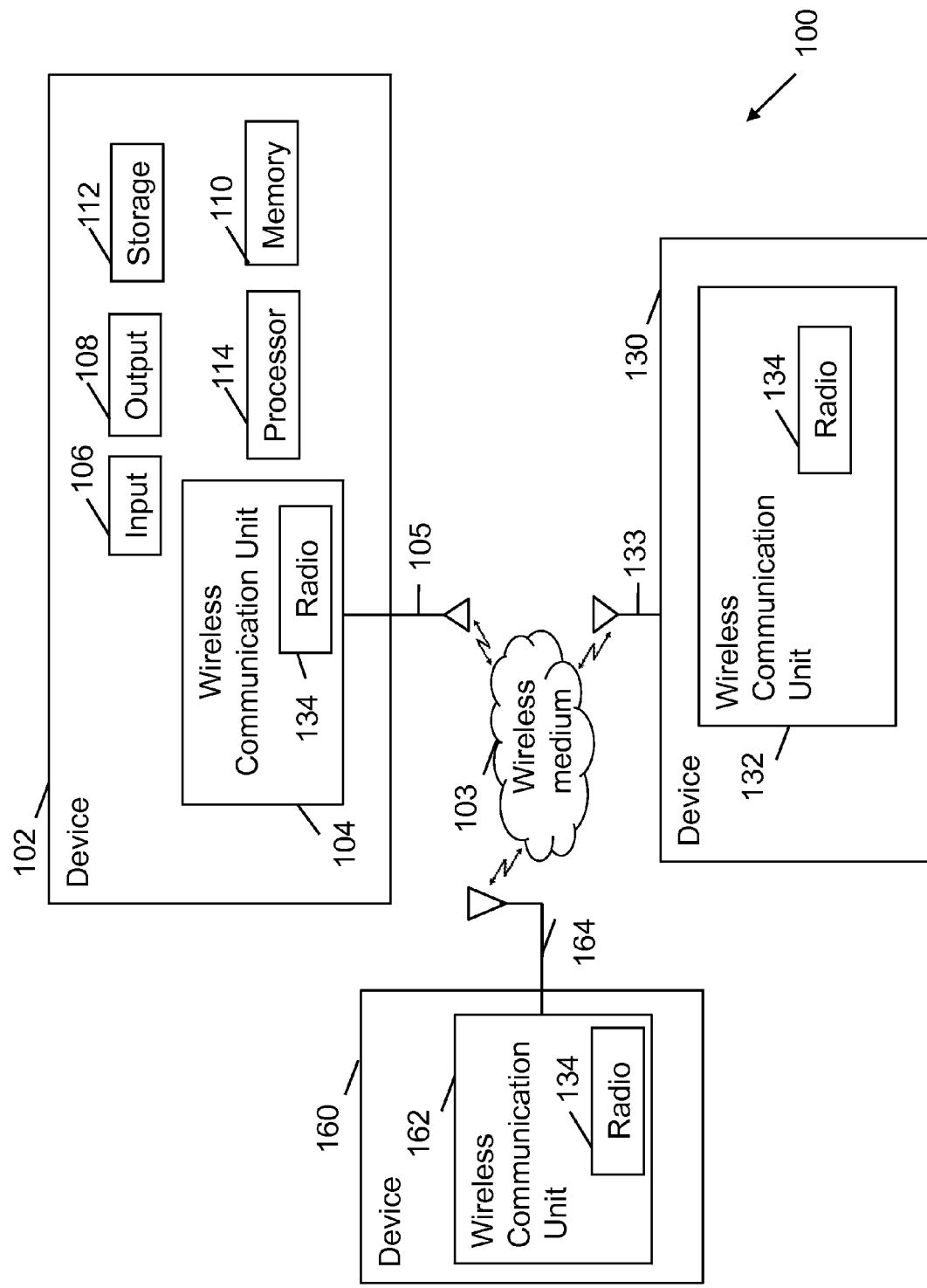
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 task group ac (*TGac*) ("*IEEE*802.11-09/0308r12—*TGac Channel Model Addendum Document*"); IEEE 802.11 task group ad (*TGad*) (*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band,* 28 *Dec.* 2012)) and/or future versions and/or —derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "station" (STA), as used herein, may include any logical entity that is a singly addressable instance of a medium access control (MAC) and a physical layer (PHY) interface to a wireless medium (WM).

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve the received signal power or signal-to-noise ratio (SNR) at an intended receiver.

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "personal basic service set" (PBSS), as used herein, may relate to a basic service set (BSS) that forms a self-contained network. For example, the PBSS may operate in the DMG band, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102, 160 and/or 130, capable of communicating content, data, information and/or signals over a wireless communication medium (WM) 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 160 and/or 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 160 and/or 130 may include wireless communication units 104, 162 and/or 132, respectively, to perform wireless communication between wireless communication devices 102, 160 and/or 130 and/or with one or more other wireless communication devices, e.g., as described below.

In some demonstrative embodiments, wireless communication devices 102, 160 and/or 130 may also include, for example, one or more of a processor 114, an input unit 106, an output unit 108, a memory unit 110, and a storage unit 112. Wireless communication devices 102, 160 and/or 130 may optionally include other hardware components and/or software components. In some demonstrative embodiments, some or all of the components of one or more of wireless communication devices 102, 160 and/or 130 may be enclosed in a common housing or packaging, and may be interconnected or operably associated using one or more wired or wireless links. In other embodiments, components of one or more of wireless communication devices 102, 160 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102, 160 and/or 130 and/or of one or more applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102, 160 and/or 130.

In some demonstrative embodiments, wireless communication units 104, 162 and 132 may include, or may be associated with, one or more antennas 105, 164 and 133, respectively. Antennas 105, 164 and/or 133 may include any type of antennas suitable for transmitting and/or receiving wireless communication signals, blocks, frames, transmission streams, packets, messages and/or data. For example, antennas 105, 164 and/or 133 may include any suitable configuration, structure and/or arrangement of one or more antenna elements, components, units, assemblies and/or arrays. Antennas 105, 164 and/or 133 may include, for example, antennas suitable for directional communication, e.g., using beamforming techniques. For example, antennas 105, 164 and/or 133 may include a phased array antenna, a single element antenna, a set of switched beam antennas, and/or the like. In some embodiments, antennas 105, 164 and/or 133 may implement transmit and receive functionalities using separate transmit and receive antenna elements. In some embodiments, antennas 105, 164 and/or 133 may implement transmit and receive functionalities using common and/or integrated transmit/receive elements.

In some demonstrative embodiments, wireless communication units 104, 162 and/or 132 include, for example, one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 104, 164 and/or 132 may include or may be implemented as part of a wireless Network Interface Card (NIC), and the like.

In some demonstrative embodiments, wireless communication devices 102, 160 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102, 160 and/or 130 may perform the functionality of DMG stations ("DMG STA"). For example, wireless communication devices 102, 160 and/or 130 may be configured to communicate over the DMG band.

In some demonstrative embodiments, system 100 may include a PCP/AP STA and one or more non-PCP/AP STAs. In one example, device 160 may perform the functionality of a PCP/AP STA, and/or devices 102 and/or 130 may perform the functionality of non-PCP/AP STAs. In another example, device 102 may perform the functionality of a PCP/AP STA, and/or devices 130 and/or 160 may perform the functionality of non-PCP/AP STAs.

In other embodiments, devices 102, 130 and/or 160 may perform the functionality of any other device and/or station.

In some demonstrative embodiments, wireless communication devices 102, 160 and/or 130 may communicate over one or more beamformed links. For example, wireless communication device 102 may communicate over one or more beamformed links with device 160, device 130 and/or one or more other wireless communication devices; device 130 may communicate over one or more beamformed links with device 160, device 102 and/or one or more other wireless communication devices; and/or device 160 may communicate over one or more beamformed links with device 102, device 130 and/or one or more other wireless communication devices.

In some demonstrative embodiments, first and second stations, e.g., two of devices 102, 103 and 160, may perform beamforming (BF) training, e.g., in order to determine appropriate antenna settings to be used for communicating over a beamformed link between the first and second stations. For example, the beamforming training may be performed during a Beacon Transmission Interval (BTI), an Association Beamforming Training (A-BFT) period, and/or any other period.

In some demonstrative embodiments, one station of the first and second stations may perform the functionality of a beamforming initiator station ("initiator") and another station of the two stations performs the functionality of a beamforming responder station ("responder").

In one example, the initiator may include a PCP/AP STA and the responder may include a non-PCP/non-AP STA, e.g., if the BF training is performed during the BTI and/or A-BFT. For example, a docking device (Dock) may perform the functionality of the non-PCP/AP STA, and a station device (STA) may perform the functionality of the PCP/AP STA. In other examples, the initiator and/or responder may include any other combination of any other stations.

In some demonstrative embodiments, the initiator may perform a Transmitter Sector Sweep (TXSS) to train the BF link for the initiator.

In some demonstrative embodiments, the initiator may perform a Transmit (Tx) sector sweep (TXSS) during an Initiator Sector Sweep (ISS). For example, during the Tx sector sweep (SSW) the initiator may transmit signals in multiple directions, e.g., by sweeping through a plurality of Tx sectors of the initiator.

In some demonstrative embodiments, the responder may perform a TXSS, e.g., during a Responder Sector Sweep (RSS), to train the BF link for the responder.

In some demonstrative embodiments, during the RSS the responder may transmit to the initiator one or more frames including an indication of a Tx sector ("best Tx sector") of the initiator, e.g., from which best reception was achieved during the ISS. The best Tx sector may indicate to the initiator a selected Tx sector to be used by the initiator for communicating with the responder over the beamformed link.

In some demonstrative embodiments, the initiator and responder may communicate one or more frames subsequent to the Tx sector sweep.

In some demonstrative embodiments, the initiator may transmit a SSW feedback frame to the responder, e.g., subsequent to the RSS.

In some demonstrative embodiments, the responder may transmit a SSW acknowledgement (ACK) frame, e.g., subsequent to the SSW feedback frame.

In some demonstrative embodiments, two beamformed links over a common frequency channel may interfere with one another, e.g., if the beamformed links have at least partially overlapping paths.

Some scanning and link quality measurement approaches may be used to identify existence of communicating devices over a frequency channel.

Some spectrum and radio management reports may be used to provide information about link load and BSSs observed in multiple frequency channels. However, these reports are optimized for omni-propagation of radio signals and hence may not be efficient with respect to multiple directional links, e.g., beamformed links, which may coexist in the same frequency channel without interfering with one another.

Another approach includes using Single-User Multiple-Input-Multiple Output (SU-MIMO) or Multi-User MIMO (MU-MIMO) beamforming techniques to enable a STA with multiple antennas (the beamformer) to steer signals using knowledge of the channel to improve throughput. With SU-MIMO beamforming, all space-time streams in the transmitted signal are intended for reception at a single STA.

With MU-MIMO beamforming, the space-time streams are divided between one or more STAs. However, these techniques require tight synchronization between participating devices and are limited for use only by devices that belong to the same BSS.

In some demonstrative embodiments, a device, e.g., wireless communication unit 104, may determine whether a beamformed link to be used by the device may interfere with another beamformed link used by another device, e.g., a beamformed link used by wireless communication units 132 and/or 162.

In some demonstrative embodiments, wireless communication unit 104 may determine, e.g., in advance, whether a beamformed link, e.g., a newly established beamformed link, established by wireless communication unit 104 over a channel, may interfere with one or more other, e.g., existing, beamformed links over the channel.

In some demonstrative embodiments, wireless communication unit 104 may configure the beamformed link based on the determination whether or not the beamformed link may interfere with another beamformed link on the same channel.

In some demonstrative embodiments, wireless communication unit 104 may configure the beamformed link to operate over another channel, which is different from the channel used by the other beamformed link, for example, if it is determined that the beamformed link may interfere with the other beamformed link, e.g., if the beamformed link is established over the same channel as the other beamformed link.

In some demonstrative embodiments, wireless communication unit 104 may perform directive scanning to identify whether one or more other beamformed links may interfere with the beamformed link, e.g., as described below.

In some demonstrative embodiments, wireless communication unit 104 may determine whether or not one or more other beamformed links may interfere with the beamformed link based on one or more beamforming frames communicated over WM 103, e.g., as described below.

In some demonstrative embodiments, wireless communication unit 104 may identify a beamformed link between two other devices, based on communications exchanged between the two other devices, for example, during establishment of the beamformed link between the two other devices, e.g., as described below.

In some demonstrative embodiments, wireless communication unit 104 may intercept communications exchanged by wireless communication devices 130 and 160 during establishment of a beamformed link between devices 130 and 160, e.g., as described below.

In some demonstrative embodiments, a wireless communication unit of system 100, e.g., wireless communication units 104, 132 and/or 162, may be configured to process a beamforming frame transmitted subsequent to transmission of the Tx SSW by the beamforming initiator.

In some demonstrative embodiments, the transmission of the beamforming frame may be from a first station of the beamforming initiator station or the beamforming responder station to a second station of the beamforming initiator station or the beamforming responder station, e.g., as described below.

In some demonstrative embodiments, the beamforming frame may include an indication of a selected Tx sector, e.g., based on Tx SSW feedback from the second station, to be used by the first station for transmitting a directional beamformed transmission to the second station.

In some demonstrative embodiments, wireless communication unit 104 may transmit the beamforming frame including the indication of the selected Tx sector.

For example, wireless communication unit 104 may transmit the beamforming frame including an indication of a Tx sector to be used by wireless communication unit 104 for transmitting a directional beamformed transmission to wireless communication unit 132, e.g., as described below.

In some demonstrative embodiments, wireless communication unit 104 may receive the beamforming frame including the indication of the selected Tx sector.

For example, wireless communication unit 104 may receive from wireless communication unit 132 the beamforming frame including an indication of a Tx sector to be used by wireless communication unit 132 for transmitting a directional beamformed transmission, e.g., as described below.

In some demonstrative embodiments, wireless communication unit 104 may receive the beamforming frame including the indication of the selected Tx sector to be used by a first station transmitting a directional beamformed transmission to a second station.

For example, wireless communication units 132 and 162 may perform the functionality of the initiator and responder stations, and wireless communication unit 104 may receive from wireless communication unit 132 the beamforming frame including the indication of the selected Tx sector to be used by wireless communication unit 132 for transmitting a directional beamformed transmission to wireless communication unit 162, e.g., as described below.

In some demonstrative embodiments, wireless communication unit 104 may determine whether the beamformed link between wireless communication units 132 and 162 may interfere with the beamformed link to be established by wireless communication unit 104, for example, based on the indication of the selected Tx sector, e.g., as described below.

In some demonstrative embodiments, wireless communication unit 104 may determine whether the beamformed link between wireless communication units 132 and 162 may interfere with the beamformed link to be established by wireless communication unit 104, for example, even if Rx antennas of wireless communication unit 104 are operated in an omni-directional mode, and/or without requiring information relating to locations of devices 130 and/or 160.

In some demonstrative embodiments, first and second stations, e.g., wireless communication units 132 and 162, may communicate one or more BF frames including an indication of Tx sectors to be used by the stations for transmitting over a beamformed link between the first and second stations.

In some demonstrative embodiments, the first and second stations may communicate the indication of the Tx sectors as part of a SSW feedback field, e.g., as described below.

In some demonstrative embodiments, wireless communication unit 132 may transmit a SSW frame via a Tx sector of wireless communication unit 132, the SSW frame including a SSW feedback field, which may include an indication of the Tx sector of wireless communication unit 132, which is used for transmitting the SSW frame.

For example, wireless communication unit 132 may transmit to wireless communication unit 162 a SSW frame including a SSW feedback field including an indication of a Tx sector to be used by wireless communication unit 132 for transmitting over the beamformed link between wireless communication units 132 and 162.

In one example, wireless communication unit 132 may perform the functionality of the beamforming responder, and the SSW frame may include an SSW ACK frame.

In another example, wireless communication unit 132 may perform the functionality of the beamforming initiator, and the SSW frame may include an SSW Feedback frame.

In some demonstrative embodiments, wireless communication unit 104 may operate a receiver of wireless communication unit 104 at a quasi omni-directional mode to receive communications from multiple directions.

In some demonstrative embodiments, wireless communication unit 104 may receive BF frames communicated by other devices, e.g., during establishment of beamformed links. The BF frames may include an indication of the Tx sectors to be used for transmission over the BF links. For example, wireless communication unit 104 may receive the SSW frame communicated between wireless communication units 132 and 162.

In some demonstrative embodiments, wireless communication unit 104 may use the received Tx sector indications to construct an interference table identifying one or more potentially interfering beamformed links, e.g., as described below.

In some demonstrative embodiments, wireless communication unit 104 may determine a channel to be used for establishing the beamformed link based on the interference table, e.g., as described below.

In some demonstrative embodiments, wireless communication unit 104 may receive a beamforming frame transmitted from wireless communication unit 132 over a first channel. The BF frame may include an indication of a Tx sector of wireless communication unit 132 for transmission of the BF frame, e.g., as described above.

In some demonstrative embodiments, wireless communication unit 104 may determine a relationship between one or more Tx sectors of wireless communication unit 104 and the Tx sector of wireless communication unit 132, e.g., as described below.

In some demonstrative embodiments, wireless communication unit 104 may identify a Tx sector of wireless communication unit 104 directed in a direction of the Tx sector of wireless communication unit 132, e.g., as described below.

In some demonstrative embodiments, wireless communication unit 104 may determine first BF information associating between a plurality of Tx sectors of wireless communication unit 104 and Tx sectors of a first plurality of stations, for example, based on beamforming training between wireless communication unit 104 and the first plurality of stations, e.g., as described below.

In some demonstrative embodiments, wireless communication unit 104 may maintain the first BF information in the form of a list of Tx sector identifiers of the plurality of Tx sectors of wireless communication unit 104, wherein a Tx identifier is associated with an address of a station of the first plurality of stations and a Tx sector identifier of a Tx sector of the station, e.g., as described below.

In some demonstrative embodiments, wireless communication unit 104 may determine second BF information associating between TX sectors of second and third pluralities of stations, for example, based on beamforming frames communicated between the second and third pluralities of stations. For example, wireless communication unit 104 may determine the second BF information associating between TX sectors of wireless communication units 132 and 162, for example, based on beamforming frames, e.g., the SSW frames, communicated between wireless communication units 132 and 162.

In one example, the first plurality of stations may include wireless communication unit 132, the second plurality of stations may include wireless communication unit 162, and the third plurality of stations may include wireless communication unit 132.

According to this example, the first BF information may associate between a Tx sector of wireless communication unit 104 and a Tx sector of wireless communication unit 132, and the second BF information may associate between a Tx sector of wireless communication unit 162 and the Tx sector of wireless communication unit 132.

In some demonstrative embodiments, wireless communication unit 104 may maintain the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations, e.g., as described below.

In some demonstrative embodiments, wireless communication unit 104 may detect an engagement between wireless communication units 132 and 162, and may determine the Tx sector of wireless communication unit 132 uses for transmission to wireless communication unit 162, e.g., based on the second BF information. Wireless communication unit 104 may identify a Tx sector of wireless communication unit 104 corresponding to the Tx sector of wireless communication unit 132, e.g., based on the first BF information.

In some demonstrative embodiments, wireless communication unit 104 may avoid communication over the first channel using a Tx sector of wireless communication unit 104, for example, if the Tx sector of wireless communication unit 104 is directed in the direction of the Tx sector of wireless communication unit 132, and wireless communication unit 104 detects that wireless communication unit 132 is engaged for communication over the first channel using the Tx sector of wireless communication unit 132, e.g., as described below.

In some demonstrative embodiments, wireless communication unit 104 may determine a second channel, different from the first channel, for communicating via the Tx sector of wireless communication unit 104, e.g., as described below.

Figure 2:
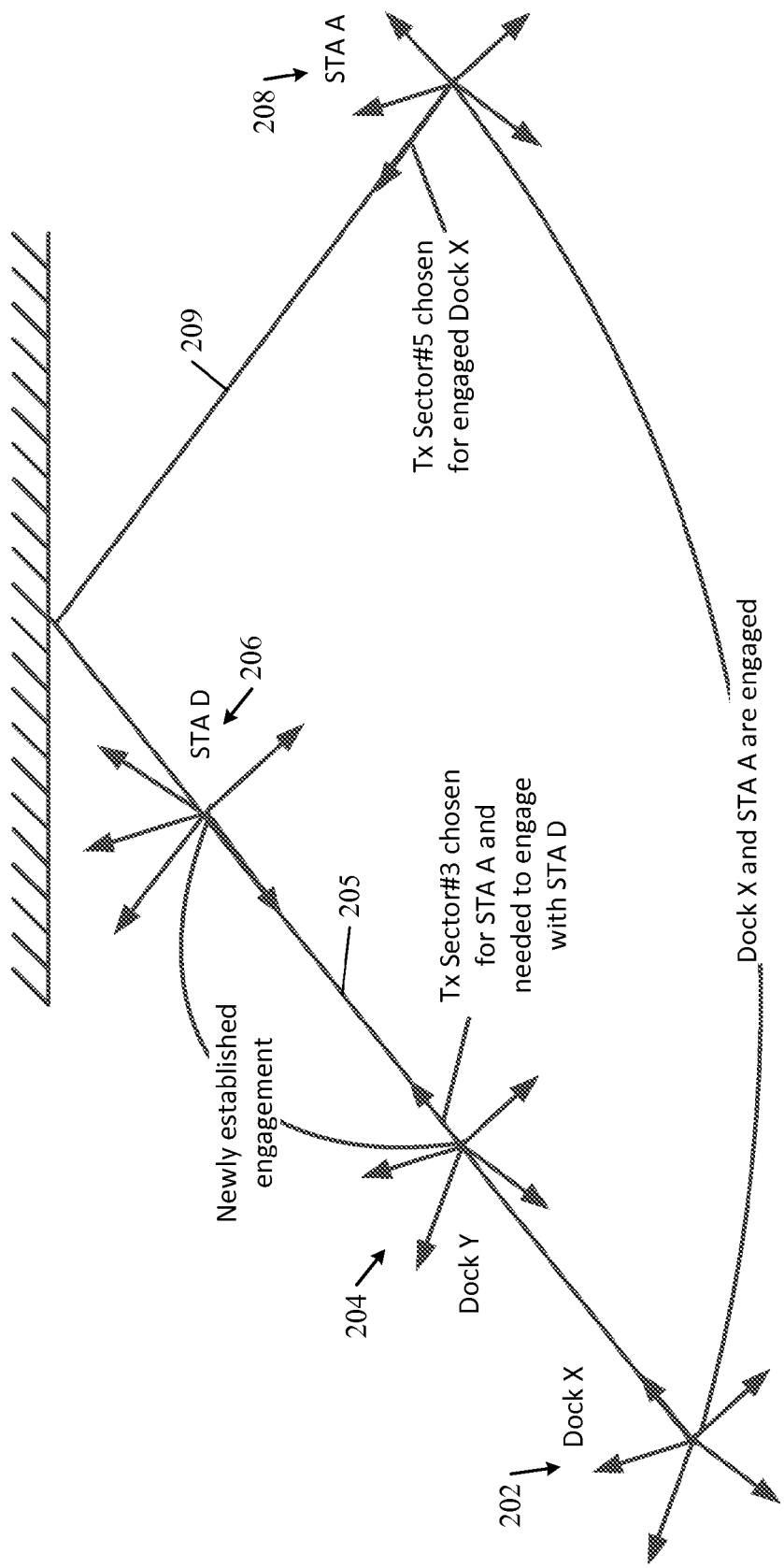
FIG. 2 is a schematic illustration of directional beamformed links between a plurality wireless communication devices, in accordance with some demonstrative embodiments.

Reference is now made to FIG. 2, which schematically illustrates directional beamformed links between a plurality wireless communication devices, in accordance with some demonstrative embodiments.

In some demonstrative embodiments, one or more of the wireless communication devices of FIG. 2 may perform the functionality of a docking station (Dock) and/or one or more of the wireless communication devices of FIG. 2 may perform the functionality of a station (STA).

For example, as shown in FIG. 2, in some demonstrative embodiments, a wireless communication device 202 may perform the functionality of a docking station, denoted Dock X, a wireless communication device 204 may perform the functionality of a docking station, denoted Dock Y, a wireless communication device 208 may perform the functionality of a station, denoted STA A, and a wireless communication device 206 may perform the functionality of a station, denoted STA D. In other embodiments, wireless communication devices 202, 204, 206 and/or 208 may perform any other functionality.

In some demonstrative embodiments, wireless communication device 204 may perform the functionality of wireless communication device 102 (FIG. 1), and/or wireless communication devices 202, 206 and/or 208 may perform the functionality of one or more other wireless communication devices of system 100 (FIG. 1), e.g., including one or more of wireless communication devices 130 and/or 160 (FIG. 1).

In some demonstrative embodiments, the Dock may be configured to support active scanning responding in A-BFT to any beacon, e.g., whether discovery or not; and/or the STA may try to establish a PBSS with a Dock by sending beacons. The STA may send the beacons, for example, also when becoming a PCP of an established PBSS.

In some demonstrative embodiments, wireless communication device 204 may attempt to establish a directional beamformed link 205 with wireless communication device 206.

In some demonstrative embodiments, wireless communication device 204 may be able to identify whether or not one or more other directional beamformed links between other devices may interfere with directional beamformed link 205, e.g., as described below.

In one example, as shown in FIG. 2, wireless communication device 204 may be able to identify that wireless communication devices 202 and 208 may be engaged in communication over a directional beamformed link 209, which may have a path overlapping with the path of directional beamformed link 205. Accordingly, wireless communication device 204 may be able to determine that directional beamformed link 209 may interfere with directional beamformed link 205, e.g., if both links 205 and 209 are formed over a common communication channel.

In some demonstrative embodiments, wireless communication device 204 may establish initial BF with one or more other beaconing devices, e.g., including STA A and other STAs, denoted STA B and STA C (not shown in FIG. 2).

In some demonstrative embodiments, wireless communication device 204 may determine for a beamformed link with a STA the Tx sector of wireless communication device 204 and the Tx sector of the STA.

In some demonstrative embodiments, wireless communication device 204 may maintain first BF information associating between the Tx sectors of wireless communication device 204 and Tx sectors of the STAs. For example, wireless communication device 204 may maintain the first BF information in the form of a table, e.g., as follows:

TABLE 1

| Chosen Dock-Y Tx sector # | STA Address | Chosen STA's Tx Sector # | Comment |
|---|---|---|---|
| 3 | A | 5 | |
| 4 | B | 8 | |
| 6 | C | 7 | |

For example, according to Table 1, a Tx sector #3 of Dock Y and a Tx sector #5 of STA A may be chosen for communicating over a BF link between Dock Y and STA A.

In some demonstrative embodiments, wireless communication device 204 may collect initial BF information of beamforming between one or more STAs and one or more other Docks, e.g., between STAs A, B and/or C and Dock X, and/or one or more Docks, e.g., two other docks, denoted Dock Z and Dock V (not shown in FIG. 2).

In some demonstrative embodiments, wireless communication device 204 may receive BF frames communicated between the STAs and Docks. For example, the BF frames may include SSW frames communicated between the STAs and Docks during BF training.

In some demonstrative embodiments, a BF frame communicated between a STA and a Dock may include an indication of a TX sector used for transmitting the BF frame, e.g., as described below.

Reference is made to FIG. 3, which schematically illustrates a SSW feedback field 300, which may be included as part of a BF frame, in accordance with some demonstrative embodiments.

In some demonstrative embodiments, SSW feedback field 300 may be communicated between first and second devices during BF training for establishing a BF link between the first and second devices. For example, SSW feedback field 300 may be communicated between a STA, e.g., STA A (FIG. 2), and a Dock, e.g., Dock X (FIG. 2).

In some demonstrative embodiments, SSW feedback field 300 may be included as part of a SSW frame, for example, a SSW ACK frame, transmitted from the BF responder to the beamforming initiator, or a SSW feedback frame transmitted from BF initiator to the BF responder.

In some demonstrative embodiments, SSW feedback field 300 may include a sector select field 302 to indicate a selected Tx sector to be used by a recipient of the SSW frame.

In some demonstrative embodiments, SSW feedback field 300 may also include a field 304, denoted sector used, to indicate a Tx sector used for transmitting the SSW feedback field 300.

For example, SSW feedback field 300 may be transmitted from STA A to Dock X, e.g., as part of the SSW feedback frame. According to this example, field 304 may include an indication of the Tx sector of STA A used for transmitting SSW feedback field 300.

In another example, SSW feedback field 300 may be transmitted from Dock X to STA A, e.g., as part of the SSW ACK frame. According to this example, field 304 may include an indication of the Tx sector of Dock X used for transmitting SSW feedback field 300.

Referring back to FIG. 2, wireless communication device 204 may maintain second BF information associating between the Tx sector of the STAs and the Docks. For example, wireless communication device 204 may determine the second BF information based on the sector used field 304 (FIG. 3) of the SSW frames communicated between the STAs and Docks.

For example, wireless communication device 204 may maintain the second BF information in the form of a table, e.g., as follows:

TABLE 2

| Dock Address | STA Address | Chosen STA Tx sector # | Comment |
|---|---|---|---|
| X | A | 5 | |
| Z | B | 9 | |
| V | C | 7 | |

In some demonstrative embodiments, Dock Y may determine the STA address information from a Tx address (TA) subfield, and the chosen STA Tx sector# from the sector Select subfield, e.g., field 304 (FIG. 3), of SSW Feedback field (FIG. 3) of a SSW frame, for example, if a Direction subfield of the SSW feedback field is set to 1 indicating that the SSW frame is sent by a beamforming responder.

In some demonstrative embodiments, Dock Y may determine the chosen Tx Sector# of the STA based on a SSW feedback frame communicated by the STA.

In some demonstrative embodiments, Dock Y may determine the chosen Tx Sector# of the STA based on a SSW ACK frame communicated by the Dock.

In some demonstrative embodiments, Dock Y may determine engagement information indicating whether or not one or more of the STAs are engaged in communication with one or more of the Docks. For example, Dock Y may observe any management frames communicated between the STAs and Docks, for example, an association response, a Group Owner (GO) negotiation frame, and/or any other frames, which may indicate engagement.

In some demonstrative embodiments, Dock Y may maintain the engagement information in the form of a table, e.g., as follows:

TABLE 3

| Dock Address | STA Address | Engagement | Comment |
|---|---|---|---|
| X | A | Yes | Association response |
| Z | B | Yes | GO negotiation response |
| V | C | No | |

In some demonstrative embodiments, Dock Y may be able to identify one or more Tx sectors of Dock Y, which may interfere with one or more other BF links.

In some demonstrative embodiments, a TX sector of Dock Y may be identified as interfering with another BF link, for example, if a transmission via the Tx sector over a BF link may interfere with one or more other BF links between one or more STAs and Docks.

In some demonstrative embodiments, Dock Y may determine whether there are any engaged links, e.g., based on the engagement information. For example, according to Table 3 Dock X and STA A may be engaged, Dock Z and STA B may be engaged, and Dock V and STA C may not be engaged.

In some demonstrative embodiments, Dock Y may determine a Tx sector of an engaged STA, e.g., based on the second BF information. For example, according to Table 2, STA A may use Tx Sector#5, and STA B may use Tx Sector#9.

In some demonstrative embodiments, Dock Y may determine if the Tx Sector of the engaged STA is a sector that the engaged STA would use to transmit to Dock Y, e.g., based on the first BF information. For example, according to Table 1, engaged STA A uses Tx sector#5 to communicate with Dock Z, and engaged STA A is to use the same Tx sector#5 for communication with Dock Y.

In some demonstrative embodiments, Dock Y may determine a Tx sector of Dock Y to be used for communicating with the engaged STA, e.g., based on the first BF information. For example, according to Table 1, Dock Y is to use Tx sector #3 to communicate with engaged STA A.

In some demonstrative embodiments, Dock Y may determine whether a BF link with a STA will potentially interfere with another BF link between two other devices.

For example, Dock Y may receive an engagement invitation from STA D, and may determine whether or not a directed BF link 205 with STA D will interfere with the directed links of the engaged devices.

In some demonstrative embodiments, Dock Y may establish initial BF with STA D, and a Tx sector of Dock Y may be selected for communicating with STA D.

In one example, Tx sector#3 of Dock Y may be selected for communicating with STA D.

According to this example, Dock Y may identify that the Tx sector#3 of Dock Y selected for communicating with STA D is the same Tx sector of Dock Y, which would be used for communication with the STA A, which in turn would use Tx sector#5 to communicate with Dock Y. According to Table 2, STA A may already be using the Tx sector#5 in the engagement with Dock X. Accordingly, Dock Y may determine that the new established beamlink 205 between Dock Y and STA D may interfere with the existing beamlink 209 between Dock X and STA A.

In some demonstrative embodiments, Dock Y may determine whether or not one or more channels are occupied and may not be used for establishing a BF link with STA D. For example, Dock Y may determine that the channel used for communication between Dock X and STA A should be avoided for establishing a BF link with STA D.

In some demonstrative embodiments, Dock Y may inform STA D about occupied and free channels for the new beamlink 205.

In some demonstrative embodiments, STA D may instruct Dock Y to switch together to one of the free channels for establishing the BF link 205 between Dock Y and STA D.

Referring back to FIG. 1, in some demonstrative embodiments, wireless communication units 104, 132 and/or 162 may communicate a beamforming frame transmitted by a station, the BF frame including a report of measurements corresponding to a Rx sector of the station from which the beamforming frame is transmitted, e.g., as described below.

In some demonstrative embodiments, the report may include a plurality of channel loads (also referred to as "link loads") corresponding to a plurality of channels, for example, some or all channels, of a wireless communication frequency band to be used for establishing a beamformed link, e.g., as described below.

In some demonstrative embodiments, the beamforming frame may include a Directional measurement report frame including the report corresponding to the Rx sector.

In some demonstrative embodiments, the Rx sector may include an Rx sector associated with a selected Tx sector of the station to be used for beamforming, e.g., as described below.

In some demonstrative embodiments, the beamforming frame may include an indication of the selected Tx sector of the station from which the BF frame is transmitted, e.g., as described below.

Reference is made to FIG. 4, which schematically illustrates a TX sector information element (IE) 400, in accordance with some demonstrative embodiments.

In some demonstrative embodiments, Tx sector IE 400 may be included as part of a beamforming frame communicated between first and second wireless communication devices.

In some demonstrative embodiments, Tx sector IE 400 may be included as part of a Directional measurement report transmitted from the first wireless communication device to the second wireless communication device.

In some demonstrative embodiments, the Directional measurement report may include a report of measurements performed by the first wireless communication device with respect to an Rx sector of the first wireless communication device, e.g., as described below.

In some demonstrative embodiments, Tx sector IE 400 may include a field 402 ("Tx sector #") indicating a Tx sector of the first wireless communication device used for transmitting Tx sector IE 400.

In some demonstrative embodiments, field 402 may indicate the selected Tx sector to be used by the first wireless communication device for communicating over a beamformed link.

In some demonstrative embodiments, field 402 may indicate the Tx sector associated with the Rx sector, e.g., as described below.

Referring back to FIG. 1, in some demonstrative embodiments, wireless communication unit 104 may maintain Tx-Rx information, e.g., in the form of a compliance table, associating between a plurality of Tx sectors of wireless communication unit 104 and a plurality of Rx sectors of wireless communication unit 104.

In some demonstrative embodiments, wireless communication unit 104 may maintain for a Tx sector of wireless communication unit 104, e.g., for each Tx sector of wireless communication unit 104, an indication of one or more Rx sectors of wireless communication unit 104 associated with the Tx sector.

In some demonstrative embodiments, the one or more Rx sectors associated with the Tx sector may one or more Rx sectors of wireless communication unit 104 having a beam directionality corresponding to the beam directionality of the Tx sector.

In one example, the Tx sector may be associated with an Rx sector, which is reciprocal to the Tx sector.

In some demonstrative embodiments, the Tx-Rx information may be maintained in the form of a table ("compliance table"), e.g., as follows:

TABLE 4

| TxSector# | RxSector# | Comments |
| --- | --- | --- |
| 1 | 1 | It may happen that one TxSector# applies to more than one RxSector# and vise versa |
| 1 | | |
| 2 | 2 | |
| 3 | 3 | |
| ... | ... | |
| 6 | 6 | |

In some demonstrative embodiments, the relationship may be one to one, e.g., if the Rx and Tx antennas are reciprocal.

In some demonstrative embodiments, different antennas may be used for Rx and Tx, and the relationship may be established, for example, during a dedicated training session, or accumulated during regular functionality. For example, wireless communication unit 104 may perform the RxSS after completion of the TxSS, RSS and SSW Feedback of the initiator and responder, e.g., if a peer device has reciprocal Tx and Rx antennas. The Rx sector identified for connection with the peer device may be complementary to the identified Tx sector and the relationship may be reflected in Table 4.

In some demonstrative embodiments, wireless communication unit 104 may use the Tx-Rx information, for example, to determine whether there may be potential interfering BF links, which may interfere with a BF link to be established by a Tx sector of wireless communication unit 104 over a communication channel, e.g., as described below.

In some demonstrative embodiments, wireless communication unit 104 may perform the functionality of a responder station and wireless communication unit 132 may perform the functionality of an initiator station for establishing a BF link between wireless communication units 104 and 132.

In some demonstrative embodiments, the Tx sector of the initiator and the Tx sector of the responder to be used for the BF link may be determined, for example, during the BF training.

In some demonstrative embodiments, wireless communication unit 104 may receive from wireless communication unit 132 an indication of the selected Tx sector to be used by wireless communication unit 104 for communicating over the BF link.

In some demonstrative embodiments, wireless communication unit 104 may identify one or more Rx sectors corresponding to the selected Tx sector of wireless communication unit 104, e.g., according to the Tx-Rx information of wireless communication unit 104. Wireless communication unit 132 may identify one or more Rx sectors corresponding to the selected Tx sector of wireless communication unit 132, e.g., according to the Tx-Rx information of wireless communication unit 132.

In some demonstrative embodiments, wireless communication unit 104 may use the one or more Rx sectors corresponding to the selected Tx sector of wireless communication unit 104 to scan one or more channels, e.g., all available channels.

In some demonstrative embodiments, wireless communication unit 132 may use the one or more Rx sectors corresponding to the selected Tx sector of wireless communication unit 132 to scan one or more channels, e.g., all available channels.

In some demonstrative embodiments, wireless communication units 104 and 132 may scan the channels independently, e.g., without any interaction between the devices with respect to or during scanning.

In some demonstrative embodiments, wireless communication unit 104 may determine a link load over a channel at a direction of an Rx sector, e.g., based on the scanning via the Rx sector.

In some demonstrative embodiments, the link load over a channel at a direction of an Rx sector may indicate potential interference in the channel at a direction of a Tx sector corresponding to the Rx sector.

In some demonstrative embodiments, wireless communication unit 104 may determine the link loads for one or more Rx sector of wireless communication unit 104, e.g., regardless of or before receiving the indication of the selected Tx sector.

For example, wireless communication unit 104 may scan the frequency channels be sweeping over the Rx sectors of wireless communication unit 104, and measuring the channel load for each Rx sector over each channel. Wireless communication unit 104 may maintain a plurality of reports of the detected channel load per Rx sector per frequency channel. Wireless communication unit 104 may receive the indication of the selected Tx sector and may retrieve a report corresponding to the Rx sector associated with the selected Tx sector, e.g., based on Table 4.

In some demonstrative embodiments, wireless communication unit 104 may perform the scanning of an Rx sector during a time period, which may not affect communications by wireless communication unit 104.

In some demonstrative embodiments, wireless communication unit 104 may perform the functionality of the BF responder. For example, wireless communication unit 104 may receive from wireless communication unit 132 a discovery beacon with a unicast Receive Address (RA) including an address of wireless communication unit 104 and including an indication of the selected Tx sector to be used by wireless communication unit 104. According to these embodiments, wireless communication unit 104 may scan the Rx sector associated with the selected Tx sector, for example, during a time period subsequent to reception of the discovery beacon, e.g., during a time of user intervention.

In some demonstrative embodiments, wireless communication unit 104 may transmit to wireless communication unit 132 a beamforming frame including an indication of the selected Tx sector to be used for beamforming, and a report of the channel loads detected at the Rx sector corresponding to the selected Tx sector.

In some demonstrative embodiments, wireless communication unit 104 may transmit to wireless communication unit 132 a directional measurement report frame including the report of the channel loads detected at the Rx sector. The directional measurement report frame may include Tx sector IE 400 including filed 402 to indicate the Tx sector corresponding to the Rx sector.

In some demonstrative embodiments, wireless communication unit 132 may receive the beamforming frame and may select a channel for establishing the beamformed link with wireless communication unit 104, e.g., based on the report.

In some demonstrative embodiments, wireless communication unit 132 may perform the functionality of a PCP/AP STA, and wireless communication unit 104 may perform the functionality of a non-PCP/AP STA. According to these embodiments, wireless communication unit 132 may select a frequency channel to use for establishing the BF link with wireless communication unit 104, and may instruct wireless communication unit 104 to switch to the selected frequency channel and to use the selected Tx sector.

Figure 5:
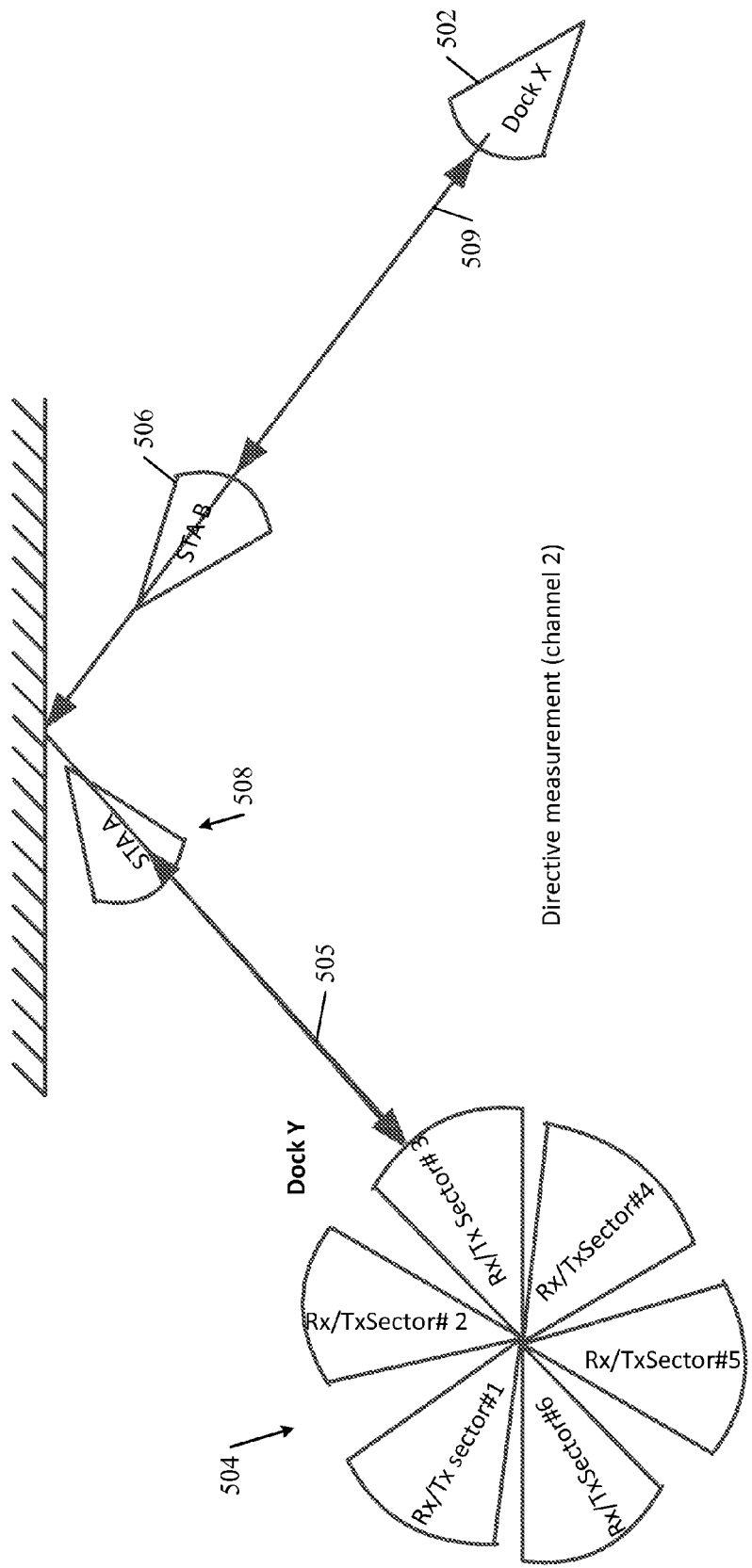
FIG. 5 is a schematic illustration of a relationship between a first directional beamformed link between first and second devices and a second beamformed link over a first channel, in accordance with some demonstrative embodiments.

Reference is now made to FIG. 5, which schematically illustrates a relationship between a first directional beamformed link 505 between a first wireless communication device 504 and a second wireless communication device 508 and a second beamformed link 509 over a first channel, in accordance with some demonstrative embodiments.

In some demonstrative embodiments, device 504 may perform the functionality of a docking station, denoted Dock Y, and device 508 may perform the functionality of a station, denoted STA A. In other embodiments, wireless communication devices 504 and/or 508 may perform any other functionality.

In some demonstrative embodiments, wireless communication device 504 may perform the functionality of wireless communication device 102 (FIG. 1), and/or wireless communication device 508 may perform the functionality of one or more other wireless communication devices of system 100 (FIG. 1), e.g., wireless communication device 130 (FIG. 1).

In some demonstrative embodiments, the beamformed link 509 may include a link between a STA 506, denoted STA B, and a Dock 508, denoted Dock X. As shown in FIG. 5, the path of beamformed link 505 may overlap with the path of beamformed link 509. Accordingly, link 505 may interfere with link 509.

In some demonstrative embodiments, Dock Y may be configured to support active scanning responding in A-BFT to any beacon, e.g., whether discovery or not; and/or the STA A may try to establish a PBSS with a Dock by sending beacons. The STA A may send the beacons, for example, also when becoming a PCP of an established PBSS.

In some demonstrative embodiments, Dock Y may establish a relationship between the Rx antenna sectors and Tx antenna sectors, for example, such that a Tx sector# may allow identifying at least one Rx sector#, e.g., as described above with reference to Table 4.

In some demonstrative embodiments, Dock Y may scan a plurality of frequency channels by sweeping through the Rx sectors, may measure channel load of each direction, and may keep reports of load per RxSector# per frequency channel, e.g., as described above.

In some demonstrative embodiments, Dock Y may reside on the first channel. For example, the first channel may include the channel "2" of a 60 GHz frequency band.

In some demonstrative embodiments, STA A may initiate engagement with Dock Y by sending discovery beacons.

In some demonstrative embodiments, a Tx sector of Dock Y, e.g., Tx Sector#3, may be identified as best to communicate with STA A in the channel 2.

In one example, STA A may provide to Dock Y an indication of the best received Tx sector# including the TX Sector#3, e.g., as part of a Beacon Transmit Interval (BTI) ABFT procedure.

In some demonstrative embodiments, Dock Y may identify the RX sector corresponding to the selected Tx sector, e.g., based on Table 4, and may determine the channel load report corresponding to the identified Rx sector.

In some demonstrative embodiments, Dock Y may retrieve the channel load report corresponding to the identified Rx sector, e.g., if Dock Y previously performed the sweep of the Rx sectors.

In other demonstrative embodiments, Dock Y may determine the channel load for the Rx sector corresponding to the Tx sector by scanning the identified Rx sector, e.g., after receiving the indication of the selected Tx sector. For example, according to these embodiments, Dock Y may be able to operate in an omni mode during relatively long time periods, e.g., to be ready to establish connection with STA as soon as possible.

In some demonstrative embodiments, Dock Y may scan the sector Rx during a time for user intervention (e.g., GO negotiation) after receiving a discovery beacon with unicast RA.

In some demonstrative embodiments, Dock Y may determine according to Table 4 that the selected Tx sector #3 corresponds to Rx sector #3.

In some demonstrative embodiments, Dock Y may perform directive measurement with Rx sector #3 in the channel 2. For example, Dock Y may perform the directive measurement in the channel 2 for a relatively long time, e.g., during a plurality of Beacon Intervals (BIs).

In some demonstrative embodiments, Dock Y may determine the channel load in channel 2 in the direction of Rx sector #3 to be relatively high, e.g., about 55%.

In some demonstrative embodiments, the channel load in channel 2 in the direction of Rx sector #3 may be relatively high, for example, due to communications over beamformed link 509 between STA B and Dock X.

In some demonstrative embodiments, Dock Y may measure the channel load in the direction of Rx sector #3 in one or more other channels, e.g., as described below.

Figure 6:
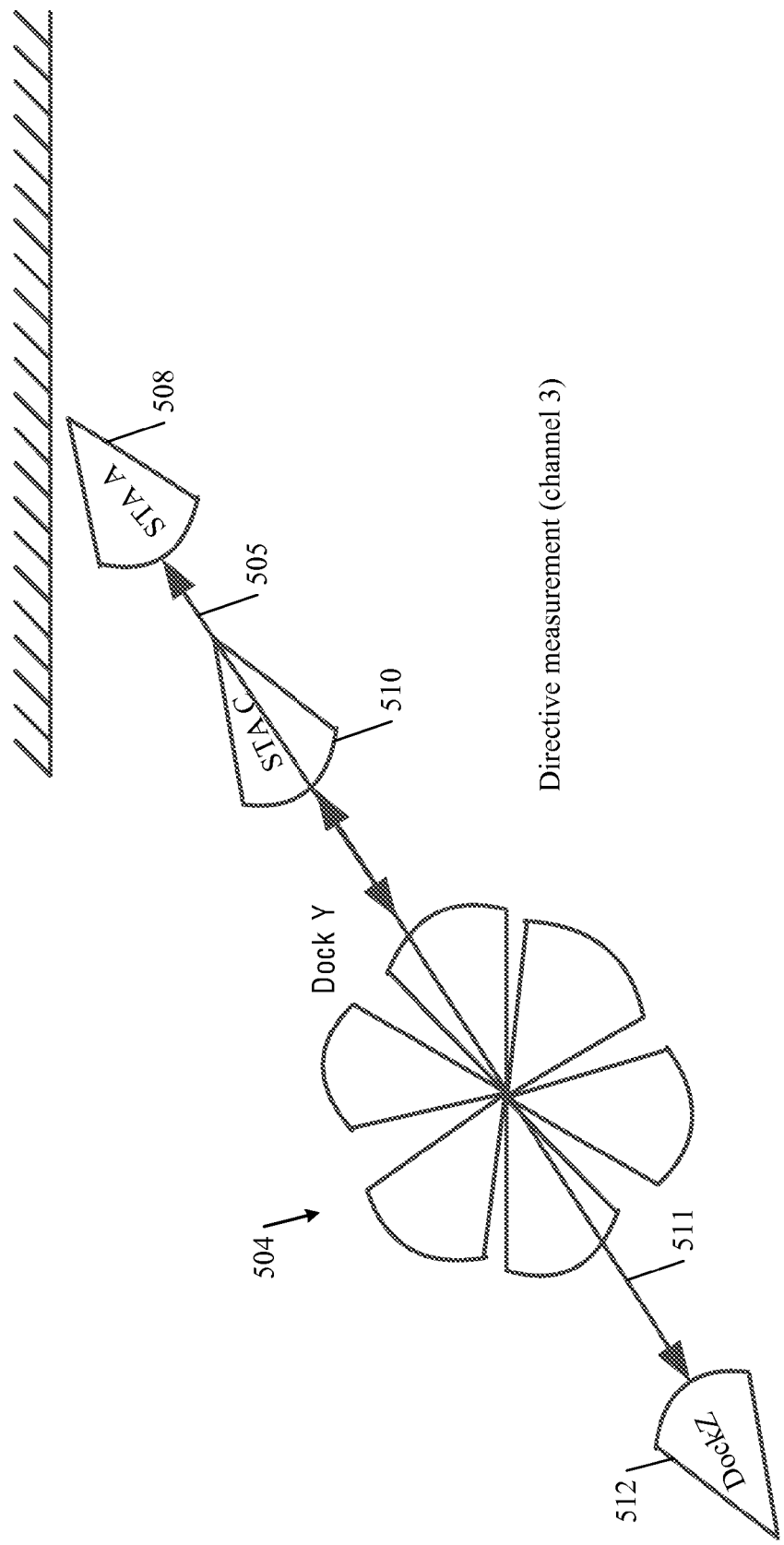
FIG. 6 is a schematic illustration of a relationship between the first directional beamformed link and a third beamformed link over a second channel, in accordance with some demonstrative embodiments.

Reference is also made to FIG. 6, which schematically illustrates a relationship between the directional beamformed link 505 and a third beamformed link 511 over a second channel, in accordance with some demonstrative embodiments.

In some demonstrative embodiments, the beamformed link 511 may include a link over the second channel between a STA 510, denoted STA C, and a Dock 512, denoted Dock Z. As shown in FIG. 6, the path of beamformed link 505 may overlap with the path of beamformed link 511. Accordingly, link 505 may interfere with link 511 over the second channel.

In some demonstrative embodiments, the second channel may include the channel "3" of the 60 GHz frequency band.

In some demonstrative embodiments, Dock Y may perform directive measurement with Rx sector #3 in the channel 3. For example, Dock Y may perform the directive measurement in the channel 3 for a relatively long time, e.g., during a plurality of BIs.

In some demonstrative embodiments, Dock Y may determine the channel load in channel 3 in the direction of Rx sector #3 to be relatively high, e.g., about 45%.

In some demonstrative embodiments, the channel load in channel 3 in the direction of Rx sector #3 may be relatively high, for example, due to communications over beamformed link 511 between STA C and Dock Z.

Figure 7:
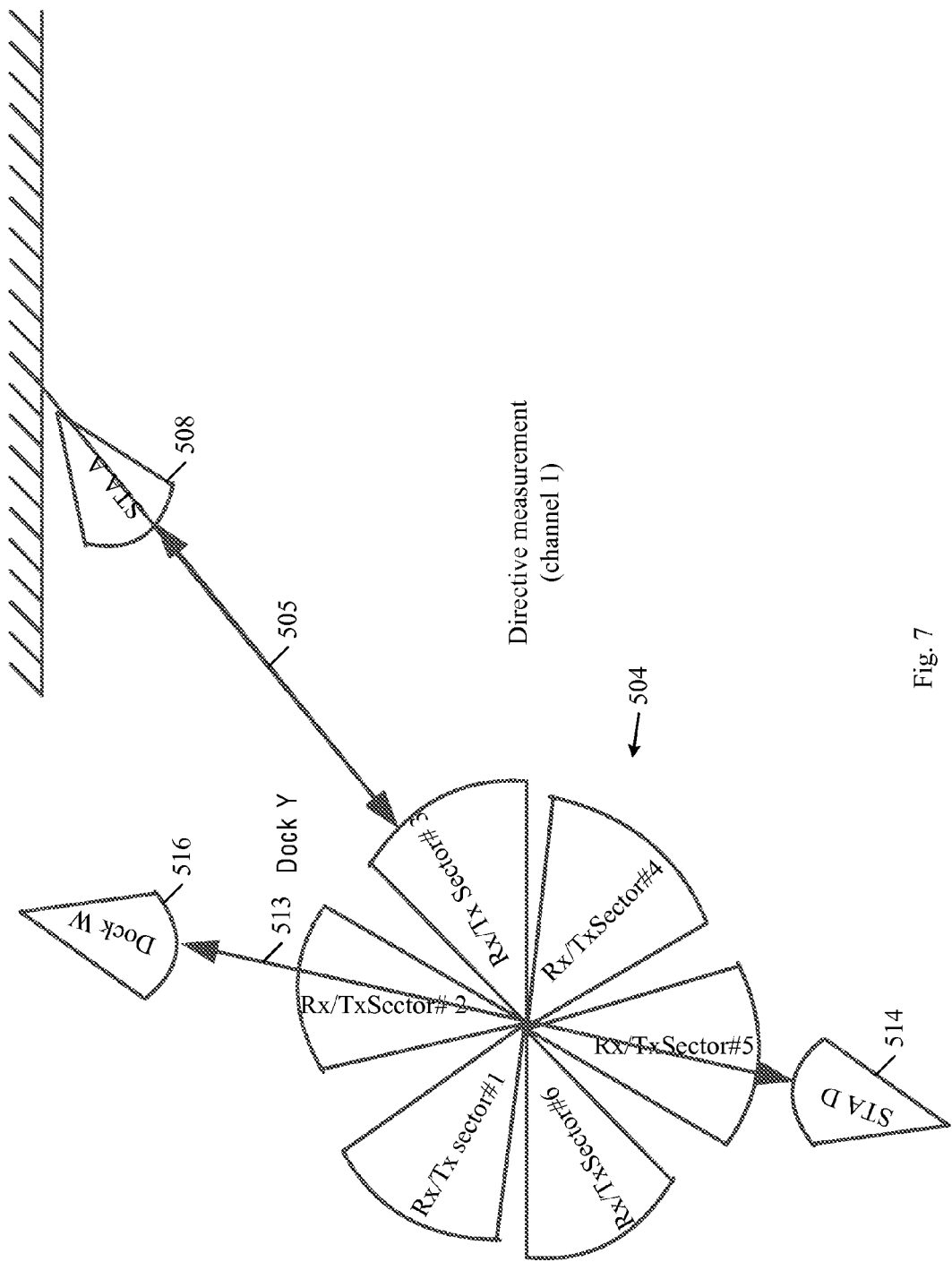
FIG. 7 is a schematic illustration of a relationship between the first directional beamformed link and a fourth beamformed link over a third channel, in accordance with some demonstrative embodiments.

Reference is also made to FIG. 7, which schematically illustrates a relationship between the directional beamformed link 505 and a fourth beamformed link 513 over a third channel, in accordance with some demonstrative embodiments.

In some demonstrative embodiments, the beamformed link 513 may include a link over the third channel between a STA 514, denoted STA D, and a Dock 516, denoted Dock W. As shown in FIG. 7, the path of beamformed link 505 may not overlap with the path of beamformed link 513. Accordingly, link 505 may not interfere with link 513 over the third channel.

In some demonstrative embodiments, the third channel may include the channel "1" of the 60 GHz frequency band.

In some demonstrative embodiments, Dock Y may perform directive measurement with Rx sector #3 in the channel 1. For example, Dock Y may perform the directive measurement in the channel 1 for a relatively long time, e.g., during a plurality of BIs.

In some demonstrative embodiments, Dock Y may determine the channel load in channel 1 in the direction of Rx sector #3 to be relatively low, e.g., about 1%.

In some demonstrative embodiments, the channel load in channel 1 in the direction of Rx sector #3 may be relatively low, for example, since the communications over beamformed link 513 between STA D and Dock W may not be in the direction of Rx Sector #3 of Dock Y.

In some demonstrative embodiments, Dock Y may generate a report including the channel load measurements in the direction of Rx sector #3, for example in the form of a table, e.g., as follows:

TABLE 5

| Channel | Rx Direction | Channel Load (%) |
|---|---|---|
| 1 | 3 | 1 |
| 2 | 3 | 55 |
| 3 | 3 | 45 |

In some demonstrative embodiments, Dock Y may transmit to STA A a BF frame, for example, a Directional measurement report frame, including the report of the channel load measurements via the Rx sector #3, e.g., according to Table 5.

In some demonstrative embodiments, the BF frame including the measurement report may include a Tx sector IE including an indication of the selected Tx sector corresponding to the Rx sector used for measuring the channel loads. For example, the Directional measurement report may include Tx sector IE 400 (FIG. 4) including field 402 (FIG. 4) indicating the selected Tx sector #.

In some demonstrative embodiments, STA A may select a channel for establishing beamformed link 505, e.g., based on the channel load report.

For example, STA A may compare the channel load measurements of the different frequency channels per Rx Sector#3 to identify a best channel to establish beamlink 505. For example, STA A may select the channel 1 having the least channel load compared to the channels 2 and 3.

In some demonstrative embodiments, STA A may request Dock Y to switch to the selected channel.

In some demonstrative embodiments, STA A may transmit to Dock Y a frame, e.g., an Extended Channel Switch Announcement frame, including a Tx sector IE including an indication of the selected Tx sector to be used by Dock Y for transmission over BF link 505. For example, the Extended Channel Switch Announcement frame may include Tx sector IE 400 (FIG. 4) including field 402 (FIG. 4) indicating the selected Tx sector #, and instructing Dock Y to switch to the channel 1 and to use Tx Sector #3 for communication with STA A over the BF link 505.

In some demonstrative embodiments, both Dock Y and STA A may switch to the channel 1 to communicate over BF link 505.

Figure 8:
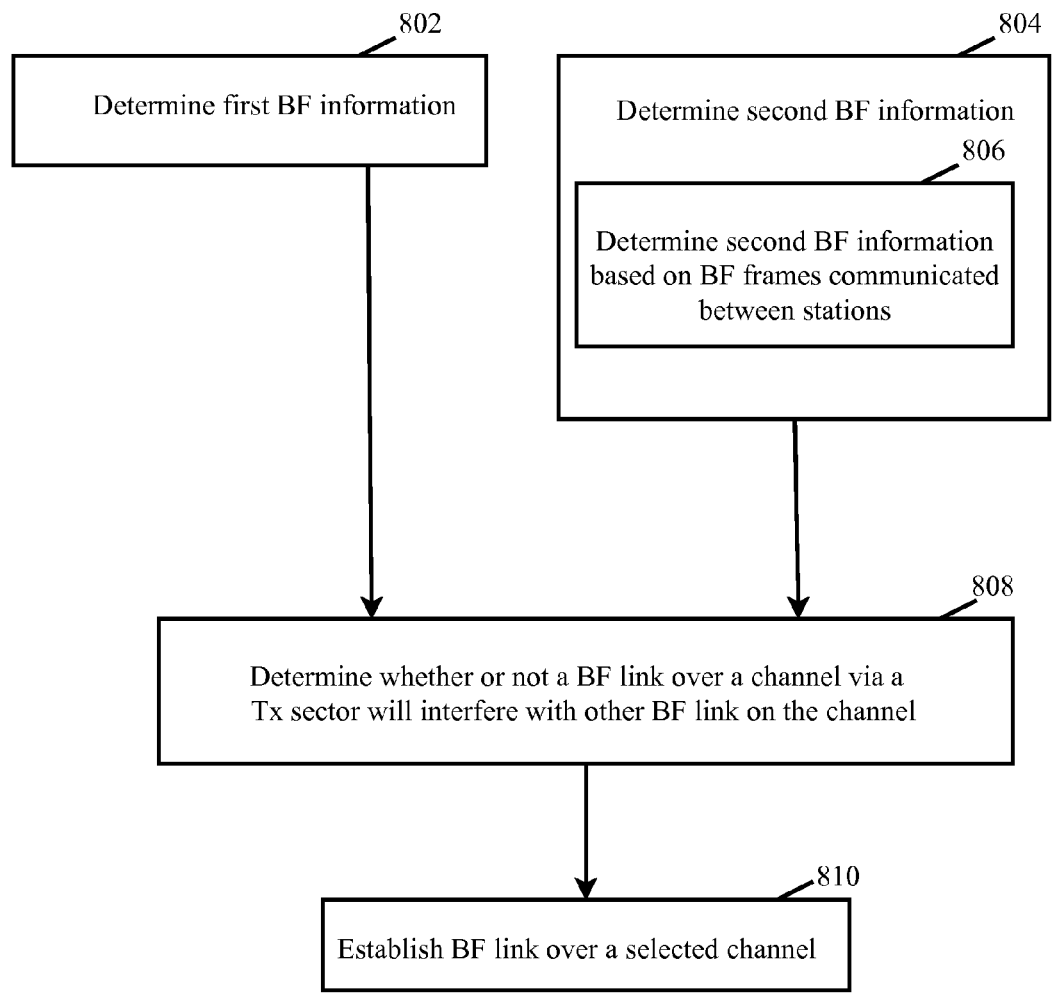
FIG. 8 is a schematic flow-chart illustration of a method of wireless communication beamforming, in accordance with some demonstrative embodiments.

Reference is made to FIG. 8, which schematically illustrates a method of wireless communication beamforming, in accordance with some demonstrative embodiments.

In some demonstrative embodiments, one or more of the operations of the method of FIG. 8 may be performed by one or more elements of a system, e.g., system 100 (FIG. 1), a wireless communication device, e.g., wireless communication devices 102, 130 and/or 160 (FIG. 1), and/or wireless communication unit, e.g., wireless communication units 104, 132 and/or 162 (FIG. 1).

As indicated at block 802, the method may include determining first BF information associating between a plurality of Tx sectors of a wireless communication device and Tx sectors of a first plurality of stations. For example, wireless communication unit 104 (FIG. 1) may determine the first BF information of Table 1, for example, based on beamforming training between wireless communication unit 104 (FIG. 1) and the first plurality of stations, e.g., as described above.

As indicated at block 804, the method may include determining second BF information associating between TX sectors of second and third pluralities of stations.

As indicated at block 806, determining the second BF information may include determining the second BF information based on beamforming frames communicated between the second and third pluralities of stations. For example, wireless communication unit 104 (FIG. 1) may determine the second BF information associating between Tx sectors of wireless communication units 132 and 162 (FIG. 1), for example, based on beamforming frames, e.g., SSW feedback fields 300 (FIG. 3) of SSW frames communicated between wireless communication units 132 and 162 (FIG. 3), as described above.

As indicated at block 808, the method may include determine whether a BF link over a channel via a Tx sector of the wireless communication device may potentially interfere with another BF link over the channel based on the first and second BF information. For example, wireless communication unit 104 (FIG. 1) may determine whether a BF link over a channel via a Tx sector of wireless communication unit 104 (FIG. 1) may interfere with a BF link over the same channel between wireless communication units 132 and 162 (FIG. 1), e.g., as described above.

As indicated at block 810, the method may include establishing the BF link using the Tx sector over a selected channel. For example, wireless communication unit 104 (FIG. 1) may establish the BF link using the Tx sector over a channel in which the BF link will not interfere with other BF links, e.g., as described above.

Figure 9:
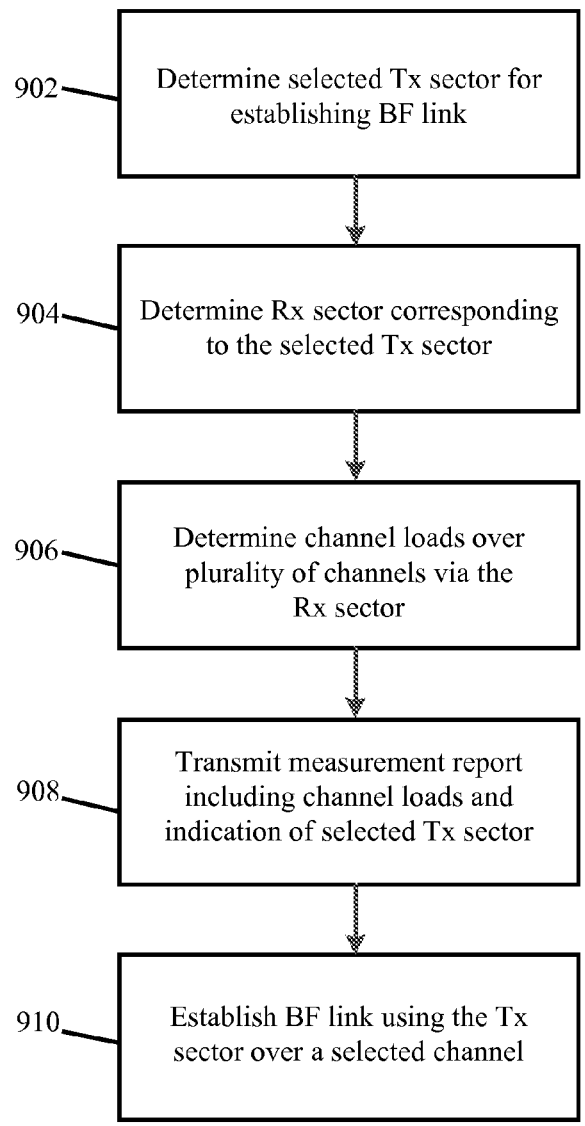
FIG. 9 is a schematic flow-chart illustration of a method of wireless communication beamforming, in accordance with some demonstrative embodiments.

Reference is made to FIG. 9, which schematically illustrates a method of wireless communication beamforming, in accordance with some demonstrative embodiments.

In some demonstrative embodiments, one or more of the operations of the method of FIG. 9 may be performed by one or more elements of a system, e.g., system 100 (FIG. 1), a wireless communication device, e.g., wireless communication devices 102, 130 and/or 160 (FIG. 1), and/or wireless communication unit, e.g., wireless communication units 104, 132 and/or 162 (FIG. 1).

As indicated at block 902, the method may include determining a selected Tx sector of a wireless communication device for establishing a BF link. For example, wireless communication unit 104 (FIG. 1) may receive an indication of the selected TX sector to be used by wireless communication unit 104 (FIG. 1) for establishing a BF link.

As indicated at block 904, the method may include determining at least one Rx sector of the wireless communication device corresponding to the selected Tx. For example, wireless communication unit 104 (FIG. 1) may identify the Rx sector based on the compliance table, e.g., Table 4, as described above.

As indicated at block 906, the method may include determine channel loads over a plurality of channels via the Rx sector. For example, wireless communication unit 104 (FIG. 1) may scan a plurality of channels via the Rx sector to determine a plurality of channel loads over the plurality of channels, e.g., as described above.

As indicated at block 908, the method may include transmitting a measurement report including the plurality of channel loads and an indication of the selected Tx sector. For example, wireless communication unit 104 (FIG. 1) may transmit the Directional Measurement report including the channel load measurements via the Rx sector, and including Tx Sector IE 400 (FIG. 1) identifying the selected TX sector, e.g., as described above.

As indicated at block 910, the method may include establishing the BF link using the Tx sector over a selected channel. For example, wireless communication unit 104 (FIG. 1) may establish the BF link using the Tx sector over a channel having a reduced, e.g., minimal, channel load, e.g., as described above.

Figure 10:
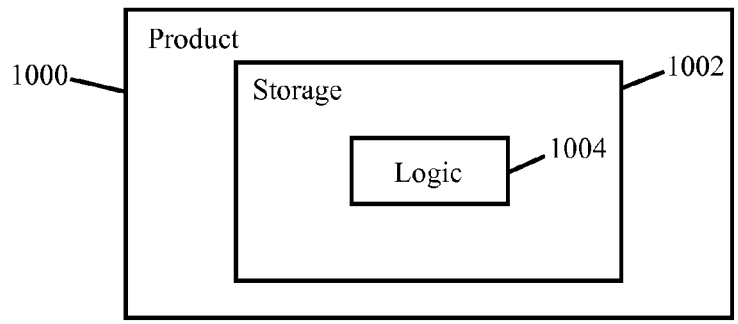
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of device 102 (FIG. 1), device 130 (FIG. 1), device 160 (FIG. 1), wireless communication unit 104 (FIG. 1), wireless communication unit 162 (FIG. 1), wireless communication unit 132 (FIG. 1) and/or to perform one or more operations of the method of FIGS. 8 and/or 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a wireless communication unit to process a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

Example 2 includes the subject matter of Example 1 and optionally, wherein the beamforming frame comprises a report of measurements corresponding to a Receive (Rx) sector of the first station.

Example 3 includes the subject matter of Example 2 and optionally, wherein the Rx sector has a beam directionality corresponding to a beam directionality of the Tx sector.

Example 4 includes the subject matter of Example 3 and optionally, wherein the Rx sector is reciprocal to the Tx sector.

Example 5 includes the subject matter of any one of Examples 2-4 and optionally, wherein the wireless communication unit is to maintain Tx-Rx information associating between a plurality of Tx sectors and a plurality of Rx sectors and to select the Rx sector to include an Rx sector associated with the selected Tx sector.

Example 6 includes the subject matter of Example 5 and optionally, wherein the report comprises a plurality of channel loads corresponding to a plurality of channels.

Example 7 includes the subject matter of Example 6 and optionally, wherein the wireless communication unit is to perform the functionality of the beamforming responder station, the wireless communication unit is to receive the selected Tx sector from the beamforming initiator station, to determine the Rx sector based on the selected Tx sector, to determine the channel loads corresponding to the RX sector, and to transmit the beamforming frame including the report to the beamforming initiator station.

Example 8 includes the subject matter of Example 7 and optionally, wherein the wireless communication unit is to receive a discovery beacon with a unicast Receive Address (RA) including an address of the beamforming responder station and including an indication of the selected Tx sector, and wherein the wireless communication unit is to measure the loads during a time period subsequent to reception of the discovery beacon.

Example 9 includes the subject matter of Example 6 and optionally, wherein the wireless communication unit is to perform the functionality of the beamforming initiator station, the wireless communication unit is to receive the beamforming frame from the beamforming responder station, and to select a channel to be used for the directional beamformed transmission based on the plurality of channel loads.

Example 10 includes the subject matter of any one of Examples 2-9 and optionally, wherein the beamforming frame comprises a Directional measurement report frame including an indication of a direction of the Rx sector and a Tx sector information element (IE), the Tx sector IE including the indication of the Tx sector.

Example 11 includes the subject matter of Example 1 and optionally, wherein the beamforming frame comprises a Sector Sweep (SSW) frame including a SSW feedback field, the SSW feedback field including the indication of the Tx sector.

Example 12 includes the subject matter of Example 11 and optionally, wherein the wireless communication unit is to perform the functionality of a third station to receive the beamforming frame, the wireless communication unit is to determine, based on the beamforming frame, a directional beamforming scheme to be used by the third station.

Example 13 includes the subject matter of Example 12 and optionally, wherein the wireless communication unit is to detect the first and second stations are engaged for communication over a communication channel using the Tx sector of the first station, and wherein the wireless communication unit is to avoid communication over the channel using a Tx sector of the third station directed to the TX sector of the first station.

Example 14 includes the subject matter of Example 13 and optionally, wherein the wireless communication unit is to determine first BF information associating between Tx sectors of the third station and Tx sectors of a first plurality of stations, and, based on SSW feedback fields of SSW feedback frames communicated between second and third pluralities of stations to determine second BF information associating between Tx sectors of the second plurality of stations and the third plurality of stations.

Example 15 includes the subject matter of Example 14 and optionally, wherein the wireless communication unit is to detect an engagement between a first engaged station of the second plurality of stations and a second engaged station of the third plurality of stations, to determine an engaged Tx sector of the first engaged station based on the second BF information, and to detect, based on the first BF information, the Tx sector of the third station associated with the engaged Tx sector.

Example 16 includes the subject matter of Example 1 and optionally, wherein the wireless communication unit is to perform the functionality of the first station, the wireless communication unit is to transmit the beamforming frame including an indication of a Tx sector to be used by the wireless communication unit for transmitting the directional beamformed transmission to the second station.

Example 17 includes the subject matter of Example 1 and optionally, wherein the wireless communication unit is to receive the beamforming frame from the first station.

Example 18 includes the subject matter of Example 17 and optionally, wherein the wireless communication unit is to perform the functionality of the second station.

Example 19 includes the subject matter of any one of Examples 1-18 and optionally, wherein the wireless communication unit is to communicate the beamforming frame over a millimeterWave (mmWave) wireless communication band.

Example 20 includes an apparatus comprising a station to transmit a Sector Sweep (SSW) frame via a Transmit (Tx) sector of a the station, the SSW frame including a SSW feedback field, the SSW feedback field including an indication of the Tx sector.

Example 21 includes the subject matter of Example 20 and optionally, wherein the station is to perform the functionality of a beamforming responder.

Example 22 includes the subject matter of Example 20 and optionally, wherein the SSW frame comprises SSW acknowledge (ACK) frame.

Example 23 includes the subject matter of any one of Examples 20-22 and optionally, wherein the station is to transmit the SSW frame subsequent to a Tx sector sweep by a beamforming initiator.

Example 24 includes the subject matter of any one of Examples 20-23 and optionally, wherein the station is to transmit the SSW frame over a millimeterWave (mmWave) wireless communication band.

Example 25 includes an apparatus comprising a first station to receive a beamforming frame transmitted from a second station to a third station over a first channel, the beamforming frame comprises an indication of a Transmit (Tx) sector of the second station for transmission of the frame, wherein based on the indication of the Tx sector, the first station is to determine a second channel, different from the first channel, for communicating via a Tx sector of the first station.

Example 26 includes the subject matter of Example 25 and optionally, wherein the first station is to determine first BF information associating between a plurality of Tx sectors of the first station and Tx sectors of a first plurality of stations, and, based on beamforming frames communicated between second and third pluralities of stations to determine second BF information associating between Tx sectors of the second plurality of stations and the third plurality of stations.

Example 27 includes the subject matter of Example 26 and optionally, wherein the first station is to maintain the first BF information in the form of a list of Tx sector identifiers of the plurality of Tx sectors of the first station, wherein a Tx identifier is associated with an address of a station of the first plurality of stations and a Tx sector identifier of a Tx sector of the station of the first plurality of stations.

Example 28 includes the subject matter of Example 26 or 27 and optionally, wherein the first station is to maintain the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations.

Example 29 includes the subject matter of any one of Examples 26-28 and optionally, wherein the first plurality of stations includes the second station, the second plurality of stations includes the third station and the third plurality of stations includes the second station.

Example 30 includes the subject matter of any one of Examples 26-29 and optionally, wherein the first station is to detect an engagement between the second and third stations, to determine the Tx sector of the second station based on the second BF information, and to detect the Tx sector of the first station based on the Tx sector of the second station and the first BF information.

Example 31 includes the subject matter of any one of Examples 25-30 and optionally, wherein the first station is to avoid communication over the first channel using the Tx sector of the first station, if the first station is to detect the second and third stations are engaged for communication over the first channel using the Tx sector of the second station.

Example 32 includes the subject matter of any one of Examples 25-31 and optionally, wherein the Tx sector of the first station is in a direction of the Tx sector of the second station.

Example 33 includes the subject matter of any one of Examples 25-32 and optionally, wherein the beamforming frame comprises a Sector Sweep (SSW) frame including a SSW feedback field, the SSW feedback field including the indication of the Tx sector of the second station.

Example 34 includes the subject matter of any one of Examples 25-33 and optionally, wherein the first station comprises a dock station.

Example 35 includes an apparatus comprising a first station to transmit to a second station a beamforming frame including a report of measurements corresponding to a Receive (Rx) sector of the first station, and an indication of a Transmit (Tx) sector to be used by the first station for transmitting a directional beamformed transmission to the second station.

Example 36 includes the subject matter of Example 35 and optionally, wherein the Rx sector has a beam directionality corresponding to a beam directionality of the Tx sector.

Example 37 includes the subject matter of Example 36 and optionally, wherein the Rx sector is reciprocal to the Tx sector.

Example 38 includes the subject matter of any one of Examples 35-37 and optionally, wherein the first station is to maintain Tx-Rx information associating between a plurality of Tx sectors of the first station and a plurality of Rx sectors of the first station and to select the Rx sector to include an Rx sector associated with the Tx sector.

Example 39 includes the subject matter of any one of Examples 35-38 and optionally, wherein the report comprises a plurality of channel loads corresponding to a plurality of channels.

Example 40 includes the subject matter of Example 39 and optionally, wherein the first station is to receive an indication of the Tx sector from the second station, to determine the Rx sector based on the Tx sector, and to determine the channel loads corresponding to the RX sector.

Example 41 includes the subject matter of Example 40 and optionally, wherein the first station is to receive a discovery beacon with a unicast Receive Address (RA) including an address of the second station and including the indication of the Tx sector, and wherein the first station is to measure the loads during a time period subsequent to reception of the discovery beacon.

Example 42 includes the subject matter of any one of Examples 35-41 and optionally, wherein the beamforming frame comprises a Directional measurement report frame including an indication of a direction of the Rx sector and a Tx sector information element (IE), the Tx sector IE including the indication of the Tx sector.

Example 43 includes the subject matter of any one of Examples 35-42 and optionally, wherein the first station is to perform the functionality of a beamforming responder.

Example 44 includes a system comprising at least one wireless communication device including one or more antennas; and a wireless communication unit to process a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

Example 45 includes the subject matter of Example 44 and optionally, wherein the beamforming frame comprises a report of measurements corresponding to a Receive (Rx) sector of the first station.

Example 46 includes the subject matter of Example 45 and optionally, wherein the Rx sector has a beam directionality corresponding to a beam directionality of the Tx sector.

Example 47 includes the subject matter of Example 46 and optionally, wherein the Rx sector is reciprocal to the Tx sector.

Example 48 includes the subject matter of any one of Examples 45-47 and optionally, wherein the wireless communication unit is to maintain Tx-Rx information associating between a plurality of Tx sectors and a plurality of Rx sectors and to select the Rx sector to include an Rx sector associated with the selected Tx sector.

Example 49 includes the subject matter of Example 48 and optionally, wherein the report comprises a plurality of channel loads corresponding to a plurality of channels.

Example 50 includes the subject matter of Example 49 and optionally, wherein the wireless communication unit is to perform the functionality of the beamforming responder station, the wireless communication unit is to receive the selected Tx sector from the beamforming initiator station, to determine the Rx sector based on the selected Tx sector, to determine the channel loads corresponding to the RX sector, and to transmit the beamforming frame including the report to the beamforming initiator station.

Example 51 includes the subject matter of Example 50 and optionally, wherein the wireless communication unit is to receive a discovery beacon with a unicast Receive Address (RA) including an address of the beamforming responder station and including an indication of the selected Tx sector, and wherein the wireless communication unit is to measure the loads during a time period subsequent to reception of the discovery beacon.

Example 52 includes the subject matter of Example 49 and optionally, wherein the wireless communication unit is to perform the functionality of the beamforming initiator station, the wireless communication unit is to receive the beamforming frame from the beamforming responder station, and to select a channel to be used for the directional beamformed transmission based on the plurality of channel loads.

Example 53 includes the subject matter of any one of Examples 45-52 and optionally, wherein the beamforming frame comprises a Directional measurement report frame including an indication of a direction of the Rx sector and a Tx sector information element (IE), the Tx sector IE including the indication of the Tx sector.

Example 54 includes the subject matter of Example 44 and optionally, wherein the beamforming frame comprises a Sector Sweep (SSW) frame including a SSW feedback field, the SSW feedback field including the indication of the Tx sector.

Example 55 includes the subject matter of Example 54 and optionally, wherein the wireless communication unit is to perform the functionality of a third station to receive the beamforming frame, the wireless communication unit is to determine, based on the beamforming frame, a directional beamforming scheme to be used by the third station.

Example 56 includes the subject matter of Example 55 and optionally, wherein the wireless communication unit is to detect the first and second stations are engaged for communication over a communication channel using the Tx sector of the first station, and wherein the wireless communication unit is to avoid communication over the channel using a Tx sector of the third station directed to the TX sector of the first station.

Example 57 includes the subject matter of Example 56 and optionally, wherein the wireless communication unit is to determine first BF information associating between Tx sectors of the third station and Tx sectors of a first plurality of stations, and, based on SSW feedback fields of SSW feedback frames communicated between second and third pluralities of stations to determine second BF information associating between Tx sectors of the second plurality of stations and the third plurality of stations.

Example 58 includes the subject matter of Example 57 and optionally, wherein the wireless communication unit is to detect an engagement between a first engaged station of the second plurality of stations and a second engaged station of the third plurality of stations, to determine an engaged Tx sector of the first engaged station based on the second BF information, and to detect, based on the first BF information, the Tx sector of the third station associated with the engaged Tx sector.

Example 59 includes the subject matter of Example 44 and optionally, wherein the wireless communication unit is to perform the functionality of the first station, the wireless communication unit is to transmit the beamforming frame including an indication of a Tx sector to be used by the wireless communication unit for transmitting the directional beamformed transmission to the second station.

Example 60 includes the subject matter of Example 44 and optionally, wherein the wireless communication unit is to receive the beamforming frame from the first station.

Example 61 includes the subject matter of Example 60 and optionally, wherein the wireless communication unit is to perform the functionality of the second station.

Example 62 includes the subject matter of any one of Examples 44-61 and optionally, wherein the wireless communication unit is to communicate the beamforming frame over a millimeterWave (mmWave) wireless communication band.

Example 63 includes a system comprising at least one wireless communication device including one or more antennas; and a station to transmit a Sector Sweep (SSW) frame via a Transmit (Tx) sector of a the wireless communication device, the SSW frame including a SSW feedback field, the SSW feedback field including an indication of the Tx sector.

Example 64 includes the subject matter of Example 63 and optionally, wherein the station is to perform the functionality of a beamforming responder.

Example 65 includes the subject matter of Example 63 and optionally, wherein the SSW frame comprises SSW acknowledge (ACK) frame.

Example 66 includes the subject matter of any one of Examples 63-65 and optionally, wherein the station is to transmit the SSW frame subsequent to a Tx sector sweep by a beamforming initiator.

Example 67 includes the subject matter of any one of Examples 63-66 and optionally, wherein the station is to transmit the SSW frame over a millimeterWave (mmWave) wireless communication band.

Example 68 includes a system comprising at least one wireless communication device including one or more antennas; and a first station to receive a beamforming frame transmitted from a second station to a third station over a first channel, the beamforming frame comprises an indication of a Transmit (Tx) sector of the second station for transmission of the frame, wherein based on the indication of the Tx sector, the first station is to determine a second channel, different from the first channel, for communicating via a Tx sector of the first station.

Example 69 includes the subject matter of Example 68 and optionally, wherein the first station is to determine first BF information associating between a plurality of Tx sectors of the first station and Tx sectors of a first plurality of stations, and, based on beamforming frames communicated between second and third pluralities of stations to determine second BF information associating between Tx sectors of the second plurality of stations and the third plurality of stations.

Example 70 includes the subject matter of Example 69 and optionally, wherein the first station is to maintain the first BF information in the form of a list of Tx sector identifiers of the plurality of Tx sectors of the first station, wherein a Tx identifier is associated with an address of a station of the first plurality of stations and a Tx sector identifier of a Tx sector of the station of the first plurality of stations.

Example 71 includes the subject matter of Example 69 or 70 and optionally, wherein the first station is to maintain the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations.

Example 72 includes the subject matter of any one of Examples 69-71 and optionally, wherein the first plurality of stations includes the second station, the second plurality of stations includes the third station and the third plurality of stations includes the second station.

Example 73 includes the subject matter of any one of Examples 69-72 and optionally, wherein the first station is to detect an engagement between the second and third stations, to determine the Tx sector of the second station based on the second BF information, and to detect the Tx sector of the first station based on the Tx sector of the second station and the first BF information.

Example 74 includes the subject matter of any one of Examples 68-73 and optionally, wherein the first station is to avoid communication over the first channel using the Tx sector of the first station, if the first station is to detect the second and third stations are engaged for communication over the first channel using the Tx sector of the second station.

Example 75 includes the subject matter of any one of Examples 68-74 and optionally, wherein the Tx sector of the first station is in a direction of the Tx sector of the second station.

Example 76 includes the subject matter of any one of Examples 68-75 and optionally, wherein the beamforming frame comprises a Sector Sweep (SSW) frame including a SSW feedback field, the SSW feedback field including the indication of the Tx sector of the second station.

Example 77 includes the subject matter of any one of Examples 68-76 and optionally, wherein the first station comprises a dock station.

Example 78 includes a system comprising at least one wireless communication device including one or more antennas; and a first station to transmit to a second station a beamforming frame including a report of measurements corresponding to a Receive (Rx) sector of the first station, and an indication of a Transmit (Tx) sector to be used by the first station for transmitting a directional beamformed transmission to the second station.

Example 79 includes the subject matter of Example 78 and optionally, wherein the Rx sector has a beam directionality corresponding to a beam directionality of the Tx sector.

Example 80 includes the subject matter of Example 79 and optionally, wherein the Rx sector is reciprocal to the Tx sector.

Example 81 includes the subject matter of any one of Examples 78-80 and optionally, wherein the first station is to maintain Tx-Rx information associating between a plurality of Tx sectors of the first station and a plurality of Rx sectors of the first station and to select the Rx sector to include an Rx sector associated with the Tx sector.

Example 82 includes the subject matter of any one of Examples 78-81 and optionally, wherein the report comprises a plurality of channel loads corresponding to a plurality of channels.

Example 83 includes the subject matter of Example 82 and optionally, wherein the first station is to receive an indication of the Tx sector from the second station, to determine the Rx sector based on the Tx sector, and to determine the channel loads corresponding to the RX sector.

Example 84 includes the subject matter of Example 83 and optionally, wherein the first station is to receive a discovery beacon with a unicast Receive Address (RA) including an address of the second station and including the indication of the Tx sector, and wherein the first station is to measure the loads during a time period subsequent to reception of the discovery beacon.

Example 85 includes the subject matter of any one of Examples 78-84 and optionally, wherein the beamforming frame comprises a Directional measurement report frame including an indication of a direction of the Rx sector and a Tx sector information element (IE), the Tx sector IE including the indication of the Tx sector.

Example 86 includes the subject matter of any one of Examples 78-85 and optionally, wherein the first station is to perform the functionality of a beamforming responder.

Example 87 includes a method comprising processing a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

Example 88 includes the subject matter of Example 87 and optionally, wherein the beamforming frame comprises a report of measurements corresponding to a Receive (Rx) sector of the first station.

Example 89 includes the subject matter of Example 88 and optionally, wherein the Rx sector has a beam directionality corresponding to a beam directionality of the Tx sector.

Example 90 includes the subject matter of Example 89 and optionally, wherein the Rx sector is reciprocal to the Tx sector.

Example 91 includes the subject matter of any one of Examples 88-90 and optionally, comprising maintaining Tx-Rx information associating between a plurality of Tx sectors and a plurality of Rx sectors, and selecting the Rx sector to include an Rx sector associated with the selected Tx sector.

Example 92 includes the subject matter of Example 91 and optionally, wherein the report comprises a plurality of channel loads corresponding to a plurality of channels.

Example 93 includes the subject matter of Example 92 and optionally, comprising performing the functionality of the beamforming responder station; receiving the selected Tx sector from the beamforming initiator station; determining the Rx sector based on the selected Tx sector; determining the channel loads corresponding to the RX sector; and transmitting the beamforming frame including the report to the beamforming initiator station.

Example 94 includes the subject matter of Example 93 and optionally, comprising receiving a discovery beacon with a unicast Receive Address (RA) including an address of the beamforming responder station and including an indication of the selected Tx sector; and measuring the loads during a time period subsequent to reception of the discovery beacon.

Example 95 includes the subject matter of Example 92 and optionally, comprising performing the functionality of the beamforming initiator station; receiving the beamforming frame from the beamforming responder station; and selecting a channel to be used for the directional beamformed transmission based on the plurality of channel loads.

Example 96 includes the subject matter of any one of Examples 88-95 and optionally, wherein the beamforming frame comprises a Directional measurement report frame including an indication of a direction of the Rx sector and a Tx sector information element (IE), the Tx sector IE including the indication of the Tx sector.

Example 97 includes the subject matter of Example 87 and optionally, wherein the beamforming frame comprises a Sector Sweep (SSW) frame including a SSW feedback field, the SSW feedback field including the indication of the Tx sector.

Example 98 includes the subject matter of Example 97 and optionally, comprising performing the functionality of a third station to receive the beamforming frame; and determining, based on the beamforming frame, a directional beamforming scheme to be used by the third station.

Example 99 includes the subject matter of Example 98 and optionally, comprising detecting the first and second stations are engaged for communication over a communication channel using the Tx sector of the first station; and avoiding communication over the channel using a Tx sector of the third station directed to the TX sector of the first station.

Example 100 includes the subject matter of Example 99 and optionally, comprising determining first BF information associating between Tx sectors of the third station and Tx sectors of a first plurality of stations, and, based on SSW feedback fields of SSW feedback frames communicated between second and third pluralities of stations determining second BF information associating between Tx sectors of the second plurality of stations and the third plurality of stations.

Example 101 includes the subject matter of Example 100 and optionally, comprising detecting an engagement between a first engaged station of the second plurality of stations and a second engaged station of the third plurality of stations; determining an engaged Tx sector of the first engaged station based on the second BF information; and detecting, based on the first BF information, the Tx sector of the third station associated with the engaged Tx sector.

Example 102 includes the subject matter of Example 87 and optionally, comprising performing the functionality of the first station; and transmitting the beamforming frame including an indication of a Tx sector to be used by the wireless communication unit for transmitting the directional beamformed transmission to the second station.

Example 103 includes the subject matter of Example 87 and optionally, comprising receiving the beamforming frame from the first station.

Example 104 includes the subject matter of Example 103 and optionally, comprising performing the functionality of the second station.

Example 105 includes the subject matter of any one of Examples 87-104 and optionally, comprising communicating the beamforming frame over a millimeterWave (mmWave) wireless communication band.

Example 106 includes a method comprising transmitting a Sector Sweep (SSW) frame via a Transmit (Tx) sector of a wireless communication device, the SSW frame including a SSW feedback field, the SSW feedback field including an indication of the Tx sector.

Example 107 includes the subject matter of Example 106 and optionally, comprising performing the functionality of a beamforming responder.

Example 108 includes the subject matter of Example 106 and optionally, wherein the SSW frame comprises SSW acknowledge (ACK) frame.

Example 109 includes the subject matter of any one of Examples 106-108 and optionally, comprising transmitting the SSW frame subsequent to a Tx sector sweep by a beamforming initiator.

Example 110 includes the subject matter of any one of Examples 106-109 and optionally, comprising transmitting the SSW frame over a millimeterWave (mmWave) wireless communication band.

Example 111 includes a method comprising receiving by a first station a beamforming frame transmitted from a second station to a third station over a first channel, the beamforming frame comprises an indication of a Transmit (Tx) sector of the second station for transmission of the frame; and based on the indication of the Tx sector, using by the first station a second channel, different from the first channel, for communicating via a Tx sector of the first station.

Example 112 includes the subject matter of Example 111 and optionally, comprising determining first BF information associating between a plurality of Tx sectors of the first station and Tx sectors of a first plurality of stations, and, based on beamforming frames communicated between second and third pluralities of stations, determining second BF information associating between Tx sectors of the second plurality of stations and the third plurality of stations.

Example 113 includes the subject matter of Example 112 and optionally, comprising maintaining the first BF information in the form of a list of Tx sector identifiers of the plurality of Tx sectors of the first station, wherein a Tx identifier is associated with an address of a station of the first plurality of stations and a Tx sector identifier of a Tx sector of the station of the first plurality of stations.

Example 114 includes the subject matter of Example 112 or 113 and optionally, comprising maintaining the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations.

Example 115 includes the subject matter of any one of Examples 112-114 and optionally, wherein the first plurality of stations includes the second station, the second plurality of stations includes the third station and the third plurality of stations includes the second station.

Example 116 includes the subject matter of any one of Examples 112-115 and optionally, comprising detecting an engagement between the second and third stations; determining the Tx sector of the second station based on the second BF information; and detecting the Tx sector of the first station based on the Tx sector of the second station and the first BF information.

Example 117 includes the subject matter of any one of Examples 111-116 and optionally, comprising avoiding communication over the first channel using the Tx sector of the first station, if detecting the second and third stations are engaged for communication over the first channel using the Tx sector of the second station.

Example 118 includes the subject matter of any one of Examples 111-117 and optionally, wherein the Tx sector of the first station is in a direction of the Tx sector of the second station.

Example 119 includes the subject matter of any one of Examples 111-118 and optionally, wherein the beamforming frame comprises a Sector Sweep (SSW) frame including a SSW feedback field, the SSW feedback field including the indication of the Tx sector of the second station.

Example 120 includes the subject matter of any one of Examples 111-119 and optionally, wherein the first station comprises a dock station.

Example 121 includes a method comprising transmitting from a first station to a second station a beamforming frame including a report of measurements corresponding to a Receive (Rx) sector of the first station, and an indication of a Transmit (Tx) sector to be used by the first station for transmitting a directional beamformed transmission to the second station.

Example 122 includes the subject matter of Example 121 and optionally, wherein the Rx sector has a beam directionality corresponding to a beam directionality of the Tx sector.

Example 123 includes the subject matter of Example 121 and optionally, wherein the Rx sector is reciprocal to the Tx sector.

Example 124 includes the subject matter of any one of Examples 121-123 and optionally, comprising maintaining Tx-Rx information associating between a plurality of Tx sectors of the first station and a plurality of Rx sectors of the first station, and selecting the Rx sector to include an Rx sector associated with the Tx sector.

Example 125 includes the subject matter of any one of Examples 121-124 and optionally, wherein the report comprises a plurality of channel loads corresponding to a plurality of channels.

Example 126 includes the subject matter of Example 125 and optionally, comprising receiving an indication of the Tx sector from the second station, to determine the Rx sector based on the Tx sector, and determining the channel loads corresponding to the RX sector.

Example 127 includes the subject matter of Example 126 and optionally, comprising receiving a discovery beacon with a unicast Receive Address (RA) including an address of the second station and including the indication of the Tx sector; and measuring the loads during a time period subsequent to reception of the discovery beacon.

Example 128 includes the subject matter of any one of Examples 121-127 and optionally, wherein the beamforming frame comprises a Directional measurement report frame including an indication of a direction of the Rx sector and a Tx sector information element (IE), the Tx sector IE including the indication of the Tx sector.

Example 129 includes the subject matter of any one of Examples 121-128 and optionally, comprising performing the functionality of a beamforming responder.

Example 130 includes a product including a non-transitory storage medium having stored thereon instructions that, when executed by a machine, result in processing a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

Example 131 includes the subject matter of Example 130 and optionally, wherein the beamforming frame comprises a report of measurements corresponding to a Receive (Rx) sector of the first station.

Example 132 includes the subject matter of Example 131 and optionally, wherein the Rx sector has a beam directionality corresponding to a beam directionality of the Tx sector.

Example 133 includes the subject matter of Example 132 and optionally, wherein the Rx sector is reciprocal to the Tx sector.

Example 134 includes the subject matter of any one of Examples 131-133 and optionally, wherein the instructions result in maintaining Tx-Rx information associating between a plurality of Tx sectors and a plurality of Rx sectors, and selecting the Rx sector to include an Rx sector associated with the selected Tx sector.

Example 135 includes the subject matter of Example 134 and optionally, wherein the report comprises a plurality of channel loads corresponding to a plurality of channels.

Example 136 includes the subject matter of Example 135 and optionally, wherein the instructions result in performing the functionality of the beamforming responder station; receiving the selected Tx sector from the beamforming initiator station; determining the Rx sector based on the selected Tx sector; determining the channel loads corresponding to the RX sector; and transmitting the beamforming frame including the report to the beamforming initiator station.

Example 137 includes the subject matter of Example 136 and optionally, wherein the instructions result in receiving a discovery beacon with a unicast Receive Address (RA) including an address of the beamforming responder station and including an indication of the selected Tx sector; and measuring the loads during a time period subsequent to reception of the discovery beacon.

Example 138 includes the subject matter of Example 136 and optionally, wherein the instructions result in performing the functionality of the beamforming initiator station; receiving the beamforming frame from the beamforming responder station; and selecting a channel to be used for the directional beamformed transmission based on the plurality of channel loads.

Example 139 includes the subject matter of any one of Examples 131-138 and optionally, wherein the beamforming frame comprises a Directional measurement report frame including an indication of a direction of the Rx sector and a Tx sector information element (IE), the Tx sector IE including the indication of the Tx sector.

Example 140 includes the subject matter of Example 130 and optionally, wherein the beamforming frame comprises a Sector Sweep (SSW) frame including a SSW feedback field, the SSW feedback field including the indication of the Tx sector.

Example 141 includes the subject matter of Example 140 and optionally, wherein the instructions result in performing the functionality of a third station to receive the beamforming frame; and determining, based on the beamforming frame, a directional beamforming scheme to be used by the third station.

Example 142 includes the subject matter of Example 141 and optionally, wherein the instructions result in detecting the first and second stations are engaged for communication over a communication channel using the Tx sector of the first station; and avoiding communication over the channel using a Tx sector of the third station directed to the TX sector of the first station.

Example 143 includes the subject matter of Example 142 and optionally, wherein the instructions result in determining first BF information associating between Tx sectors of the third station and Tx sectors of a first plurality of stations, and, based on SSW feedback fields of SSW feedback frames communicated between second and third pluralities of stations, determining second BF information associating between Tx sectors of the second plurality of stations and the third plurality of stations.

Example 144 includes the subject matter of Example 143 and optionally, wherein the instructions result in detecting an engagement between a first engaged station of the second plurality of stations and a second engaged station of the third plurality of stations; determining an engaged Tx sector of the first engaged station based on the second BF information; and detecting, based on the first BF information, the Tx sector of the third station associated with the engaged Tx sector.

Example 145 includes the subject matter of Example 130 and optionally, wherein the instructions result in performing the functionality of the first station; and transmitting the beamforming frame including an indication of a Tx sector to be used by the wireless communication unit for transmitting the directional beamformed transmission to the second station.

Example 146 includes the subject matter of Example 130 and optionally, wherein the instructions result in receiving the beamforming frame from the first station.

Example 147 includes the subject matter of Example 146 and optionally, wherein the instructions result in performing the functionality of the second station.

Example 148 includes the subject matter of any one of Examples 130-1474 and optionally, wherein the instructions result in communicating the beamforming frame over a millimeterWave (mmWave) wireless communication band.

Example 149 includes a product including a non-transitory storage medium having stored thereon instructions that, when executed by a machine, result in transmitting a Sector Sweep (SSW) frame via a Transmit (Tx) sector of a wireless communication device, the SSW frame including a SSW feedback field, the SSW feedback field including an indication of the Tx sector.

Example 150 includes the subject matter of Example 149 and optionally, wherein the instructions result in performing the functionality of a beamforming responder.

Example 151 includes the subject matter of Example 149 and optionally, wherein the SSW frame comprises SSW acknowledge (ACK) frame.

Example 152 includes the subject matter of any one of Examples 149-151 and optionally, wherein the instructions result in transmitting the SSW frame subsequent to a Tx sector sweep by a beamforming initiator.

Example 153 includes the subject matter of any one of Examples 149-152 and optionally, wherein the instructions result in transmitting the SSW frame over a millimeterWave (mmWave) wireless communication band.

Example 154 includes a product including a non-transitory storage medium having stored thereon instructions that, when executed by a machine, result in receiving by a first station a beamforming frame transmitted from a second station to a third station over a first channel, the beamforming frame comprises an indication of a Transmit (Tx) sector of the second station for transmission of the frame; and based on the indication of the Tx sector, using by the first station a second channel, different from the first channel, for communicating via a Tx sector of the first station.

Example 155 includes the subject matter of Example 154 and optionally, wherein the instructions result in determining first BF information associating between a plurality of Tx sectors of the first station and Tx sectors of a first plurality of stations, and, based on beamforming frames communicated between second and third pluralities of stations, determining second BF information associating between Tx sectors of the second plurality of stations and the third plurality of stations.

Example 156 includes the subject matter of Example 155 and optionally, wherein the instructions result in maintaining the first BF information in the form of a list of Tx sector identifiers of the plurality of Tx sectors of the first station, wherein a Tx identifier is associated with an address of a station of the first plurality of stations and a Tx sector identifier of a Tx sector of the station of the first plurality of stations.

Example 157 includes the subject matter of Example 155 or 156 and optionally, wherein the instructions result in maintaining the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations.

Example 158 includes the subject matter of any one of Examples 155-157 and optionally, wherein the first plurality of stations includes the second station, the second plurality of stations includes the third station and the third plurality of stations includes the second station.

Example 159 includes the subject matter of any one of Examples 155-115 and optionally, wherein the instructions result in detecting an engagement between the second and third stations; determining the Tx sector of the second station based on the second BF information; and detecting the Tx sector of the first station based on the Tx sector of the second station and the first BF information.

Example 160 includes the subject matter of any one of Examples 154-159 and optionally, wherein the instructions result in avoiding communication over the first channel using the Tx sector of the first station, if detecting the second and third stations are engaged for communication over the first channel using the Tx sector of the second station.

Example 161 includes the subject matter of any one of Examples 154-160 and optionally, wherein the Tx sector of the first station is in a direction of the Tx sector of the second station.

Example 162 includes the subject matter of any one of Examples 154-161 and optionally, wherein the beamforming frame comprises a Sector Sweep (SSW) frame including a SSW feedback field, the SSW feedback field including the indication of the Tx sector of the second station.

Example 163 includes the subject matter of any one of Examples 154-162 and optionally, wherein the first station comprises a dock station.

Example 164 includes a product including a non-transitory storage medium having stored thereon instructions that, when executed by a machine, result in transmitting from a first station to a second station a beamforming frame including a report of measurements corresponding to a Receive (Rx) sector of the first station, and an indication of a Transmit (Tx) sector to be used by the first station for transmitting a directional beamformed transmission to the second station.

Example 165 includes the subject matter of Example 164 and optionally, wherein the Rx sector has a beam directionality corresponding to a beam directionality of the Tx sector.

Example 166 includes the subject matter of Example 164 and optionally, wherein the Rx sector is reciprocal to the Tx sector.

Example 167 includes the subject matter of any one of Examples 164-166 and optionally, wherein the instructions result in maintaining Tx-Rx information associating between a plurality of Tx sectors of the first station and a plurality of Rx sectors of the first station, and selecting the Rx sector to include an Rx sector associated with the Tx sector.

Example 168 includes the subject matter of any one of Examples 164-167 and optionally, wherein the report comprises a plurality of channel loads corresponding to a plurality of channels.

Example 169 includes the subject matter of Example 198 and optionally, wherein the instructions result in receiving an indication of the Tx sector from the second station, to determine the Rx sector based on the Tx sector, and determining the channel loads corresponding to the RX sector.

Example 170 includes the subject matter of Example 169 and optionally, wherein the instructions result in receiving a discovery beacon with a unicast Receive Address (RA) including an address of the second station and including the indication of the Tx sector; and measuring the loads during a time period subsequent to reception of the discovery beacon.

Example 171 includes the subject matter of any one of Examples 164-170 and optionally, wherein the beamforming frame comprises a Directional measurement report frame including an indication of a direction of the Rx sector and a Tx sector information element (IE), the Tx sector IE including the indication of the Tx sector.

Example 172 includes the subject matter of any one of Examples 164-171 and optionally, wherein the instructions result in performing the functionality of a beamforming responder.

Example 173 includes an apparatus comprising means for processing a beamforming frame communicated between a beamforming initiator station and a beamforming responder station subsequent to a Transmit (Tx) sector sweep by the beamforming initiator station, wherein transmission of the beamforming frame is from a first station of the beamforming initiator station or the beamforming responder station to a second station of the beamforming initiator station or the beamforming responder station, the beamforming frame comprises an indication of a selected Tx sector, based on the Tx sector sweep, to be used by the first station for transmitting a directional beamformed transmission to the second station.

Example 174 includes the subject matter of Example 173 and optionally, wherein the beamforming frame comprises a report of measurements corresponding to a Receive (Rx) sector of the first station.

Example 175 includes the subject matter of Example 174 and optionally, wherein the Rx sector has a beam directionality corresponding to a beam directionality of the Tx sector.

Example 176 includes the subject matter of Example 175 and optionally, wherein the Rx sector is reciprocal to the Tx sector.

Example 177 includes the subject matter of any one of Examples 174-176 and optionally, comprising means for maintaining Tx-Rx information associating between a plurality of Tx sectors and a plurality of Rx sectors, and selecting the Rx sector to include an Rx sector associated with the selected Tx sector.

Example 178 includes the subject matter of Example 177 and optionally, wherein the report comprises a plurality of channel loads corresponding to a plurality of channels.

Example 179 includes the subject matter of Example 178 and optionally, comprising means for performing the functionality of the beamforming responder station; receiving the selected Tx sector from the beamforming initiator station; determining the Rx sector based on the selected Tx sector; determining the channel loads corresponding to the RX sector; and transmitting the beamforming frame including the report to the beamforming initiator station.

Example 180 includes the subject matter of Example 179 and optionally, comprising means for receiving a discovery beacon with a unicast Receive Address (RA) including an address of the beamforming responder station and including an indication of the selected Tx sector; and measuring the loads during a time period subsequent to reception of the discovery beacon.

Example 181 includes the subject matter of Example 178 and optionally, comprising means for performing the functionality of the beamforming initiator station; receiving the beamforming frame from the beamforming responder station; and selecting a channel to be used for the directional beamformed transmission based on the plurality of channel loads.

Example 182 includes the subject matter of any one of Examples 174-181 and optionally, wherein the beamforming frame comprises a Directional measurement report frame including an indication of a direction of the Rx sector and a Tx sector information element (IE), the Tx sector IE including the indication of the Tx sector.

Example 183 includes the subject matter of Example 173 and optionally, wherein the beamforming frame comprises a Sector Sweep (SSW) frame including a SSW feedback field, the SSW feedback field including the indication of the Tx sector.

Example 184 includes the subject matter of Example 183 and optionally, comprising means for performing the functionality of a third station to receive the beamforming frame; and determining, based on the beamforming frame, a directional beamforming scheme to be used by the third station.

Example 185 includes the subject matter of Example 184 and optionally, comprising means for detecting the first and second stations are engaged for communication over a communication channel using the Tx sector of the first station; and avoiding communication over the channel using a Tx sector of the third station directed to the TX sector of the first station.

Example 186 includes the subject matter of Example 185 and optionally, comprising means for determining first BF information associating between Tx sectors of the third station and Tx sectors of a first plurality of stations, and, based on SSW feedback fields of SSW feedback frames communicated between second and third pluralities of stations determining second BF information associating between Tx sectors of the second plurality of stations and the third plurality of stations.

Example 187 includes the subject matter of Example 186 and optionally, comprising means for detecting an engagement between a first engaged station of the second plurality of stations and a second engaged station of the third plurality of stations; determining an engaged Tx sector of the first engaged station based on the second BF information; and detecting, based on the first BF information, the Tx sector of the third station associated with the engaged Tx sector.

Example 188 includes the subject matter of Example 176 and optionally, comprising means for performing the functionality of the first station; and transmitting the beamforming frame including an indication of a Tx sector to be used by the wireless communication unit for transmitting the directional beamformed transmission to the second station.

Example 189 includes the subject matter of Example 173 and optionally, comprising means for receiving the beamforming frame from the first station.

Example 190 includes the subject matter of Example 189 and optionally, comprising means for performing the functionality of the second station.

Example 191 includes the subject matter of any one of Examples 173-190 and optionally, comprising means for communicating the beamforming frame over a millimeter-Wave (mmWave) wireless communication band.

Example 192 includes an apparatus comprising means for transmitting a Sector Sweep (SSW) frame via a Transmit (Tx) sector of a wireless communication device, the SSW frame including a SSW feedback field, the SSW feedback field including an indication of the Tx sector.

Example 193 includes the subject matter of Example 192 and optionally, comprising means for performing the functionality of a beamforming responder.

Example 194 includes the subject matter of Example 192 and optionally, wherein the SSW frame comprises SSW acknowledge (ACK) frame.

Example 195 includes the subject matter of any one of Examples 192-194 and optionally, comprising means for transmitting the SSW frame subsequent to a Tx sector sweep by a beamforming initiator.

Example 196 includes the subject matter of any one of Examples 192-195 and optionally, comprising means for transmitting the SSW frame over a millimeterWave (mmWave) wireless communication band.

Example 197 includes an apparatus comprising means for receiving by a first station a beamforming frame transmitted from a second station to a third station over a first channel, the beamforming frame comprises an indication of a Transmit (Tx) sector of the second station for transmission of the frame; and means for, based on the indication of the Tx sector, using by the first station a second channel, different from the first channel, for communicating via a Tx sector of the first station.

Example 198 includes the subject matter of Example 197 and optionally, comprising means for determining first BF information associating between a plurality of Tx sectors of the first station and Tx sectors of a first plurality of stations, and, based on beamforming frames communicated between second and third pluralities of stations, determining second BF information associating between Tx sectors of the second plurality of stations and the third plurality of stations.

Example 199 includes the subject matter of Example 198 and optionally, comprising means for maintaining the first BF information in the form of a list of Tx sector identifiers of the plurality of Tx sectors of the first station, wherein a Tx identifier is associated with an address of a station of the first plurality of stations and a Tx sector identifier of a Tx sector of the station of the first plurality of stations.

Example 200 includes the subject matter of Example 198 or 199 and optionally, comprising means for maintaining the second BF information in the form of a list of station addresses of the third plurality of stations, wherein an address of a station of the third plurality of stations is associated with an address of a station of the second plurality of stations and a Tx sector identifier of a Tx sector of the station of the second plurality of stations.

Example 201 includes the subject matter of any one of Examples 198-200 and optionally, wherein the first plurality of stations includes the second station, the second plurality of stations includes the third station and the third plurality of stations includes the second station.

Example 202 includes the subject matter of any one of Examples 198-201 and optionally, comprising means for detecting an engagement between the second and third stations; determining the Tx sector of the second station based on the second BF information; and detecting the Tx sector of the first station based on the Tx sector of the second station and the first BF information.

Example 203 includes the subject matter of any one of Examples 197-202 and optionally, comprising means for avoiding communication over the first channel using the Tx sector of the first station, if detecting the second and third stations are engaged for communication over the first channel using the Tx sector of the second station.

Example 204 includes the subject matter of any one of Examples 197-203 and optionally, wherein the Tx sector of the first station is in a direction of the Tx sector of the second station.

Example 205 includes the subject matter of any one of Examples 197-204 and optionally, wherein the beamforming frame comprises a Sector Sweep (SSW) frame including a SSW feedback field, the SSW feedback field including the indication of the Tx sector of the second station.

Example 206 includes the subject matter of any one of Examples 197-205 and optionally, wherein the first station comprises a dock station.

Example 207 includes an apparatus comprising means for transmitting from a first station to a second station a beamforming frame including a report of measurements corresponding to a Receive (Rx) sector of the first station, and an indication of a Transmit (Tx) sector to be used by the first station for transmitting a directional beamformed transmission to the second station.

Example 208 includes the subject matter of Example 207 and optionally, wherein the Rx sector has a beam directionality corresponding to a beam directionality of the Tx sector.

Example 209 includes the subject matter of Example 207 and optionally, wherein the Rx sector is reciprocal to the Tx sector.

Example 210 includes the subject matter of any one of Examples 207-209 and optionally, comprising means for maintaining Tx-Rx information associating between a plurality of Tx sectors of the first station and a plurality of Rx sectors of the first station, and selecting the Rx sector to include an Rx sector associated with the Tx sector.

Example 211 includes the subject matter of any one of Examples 207-210 and optionally, wherein the report comprises a plurality of channel loads corresponding to a plurality of channels.

Example 212 includes the subject matter of Example 211 and optionally, comprising means for receiving an indication of the Tx sector from the second station, to determine the Rx sector based on the Tx sector, and determining the channel loads corresponding to the RX sector.

Example 213 includes the subject matter of Example 212 and optionally, comprising means for receiving a discovery beacon with a unicast Receive Address (RA) including an address of the second station and including the indication of the Tx sector; and measuring the loads during a time period subsequent to reception of the discovery beacon.

Example 214 includes the subject matter of any one of Examples 207-213 and optionally, wherein the beamforming frame comprises a Directional measurement report frame including an indication of a direction of the Rx sector and a Tx sector information element (IE), the Tx sector IE including the indication of the Tx sector.

Example 215 includes the subject matter of any one of Examples 207-214 and optionally, comprising means for performing the functionality of a beamforming responder.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication unit comprising circuitry and logic configured to process a beamforming frame to be received at a first wireless station, the beamforming frame comprising a frame from a second wireless station to a third wireless station, said beamforming frame comprises an indication of a selected Transmit (Tx) sector, based on a Tx sector sweep, to be used by said second wireless station for transmission of a directional beamformed transmission to said third wireless station, said wireless communication unit is configured to determine, based on said beamforming frame, a directional beamforming scheme to be used by said first wireless station.

2. The apparatus of claim 1, wherein said beamforming frame comprises a report of measurements corresponding to a Receive (Rx) sector of said second wireless station.

3. The apparatus of claim 2, wherein said Rx sector has a beam directionality corresponding to a beam directionality of said Tx sector.

4. The apparatus of claim 3, wherein said Rx sector is reciprocal to said Tx sector.

5. The apparatus of claim 2, wherein said wireless communication unit is configured to maintain Tx-Rx information associating between a plurality of Tx sectors and a plurality of Rx sectors.

6. The apparatus of claim 2, wherein said report comprises a plurality of channel loads corresponding to a plurality of channels.

7. The apparatus of claim 1, wherein said wireless communication unit is configured to receive a discovery beacon with a unicast Receive Address (RA) including an address of a beamforming responder station and including the indication of said selected Tx sector.

8. The apparatus of claim 2, wherein said beamforming frame comprises a Directional measurement report frame including an indication of a direction of said Rx sector and a Tx sector information element (IE), the Tx sector IE including the indication of said Tx sector.

9. The apparatus of claim 1, wherein said beamforming frame comprises a Sector Sweep (SSW) frame including a SSW feedback field, said SSW feedback field including the indication of said Tx sector.

10. The apparatus of claim 1, wherein said wireless communication unit is configured to detect said second and third wireless stations are engaged for communication over a communication channel using said Tx sector of said second wireless station, and wherein said wireless communication unit is configured to avoid communication over said channel using a Tx sector of said first wireless station directed to said TX sector of said second wireless station.

11. The apparatus of claim 1, wherein said wireless communication unit is configured to determine first beamforming information associating between Tx sectors of said first wireless station and Tx sectors of a first plurality of stations, and, based on SSW feedback fields of SSW feedback frames communicated between second and third pluralities of stations to determine second beamforming information associating between Tx sectors of the second plurality of stations and the third plurality of stations.

12. The apparatus of claim 11, wherein said wireless communication unit is configured to detect an engagement between a first engaged station of said second plurality of stations and a second engaged station of said third plurality of stations, to determine an engaged Tx sector of said first engaged station based on said second beamforming information, and to detect, based on said first beamforming information, a Tx sector of said first wireless station associated with said engaged Tx sector.

13. The apparatus of claim 1, wherein said wireless communication unit is configured to receive said beamforming frame from said second wireless station.

14. The apparatus of claim 1, wherein said wireless communication unit is configured to communicate said beamforming frame over a millimeterWave (mmWave) wireless communication band.

15. A method comprising:
receiving by a first station a beamforming frame transmitted from a second station to a third station over a first channel, said beamforming frame comprises an indication of a Transmit (Tx) sector of said second station for transmission of said frame;
avoiding communication over said first channel using a Tx sector of said first station, if detecting said second and third stations are engaged for communication over said first channel using the Tx sector of said second station; and
based on the indication of said Tx sector of said second station, using by said first station a second channel, different from said first channel, for communicating via the Tx sector of said first station.

16. The method of claim 15 comprising determining first beamforming information associating between a plurality of Tx sectors of said first station and Tx sectors of a first plurality of stations, and, based on beamforming frames communicated between second and third pluralities of stations, determining second beamforming information associating between Tx sectors of the second plurality of stations and the third plurality of stations.

17. The method of claim 16 comprising detecting an engagement between said second and third stations; determining the Tx sector of said second station based on said second beamforming information; and detecting the Tx sector of said first station based on the Tx sector of said second station and said first beamforming information.

18. The method of claim 15, wherein said beamforming frame comprises a Sector Sweep (SSW) frame including a SSW feedback field, said SSW feedback field including the indication of said Tx sector of said second station.

19. A product comprising a non-transitory storage medium having stored thereon instructions that, when executed by a machine, result in:
receiving by a first station a beamforming frame transmitted from a second station to a third station over a first channel, said beamforming frame comprises an indication of a Transmit (Tx) sector of said second station for transmission of said frame;
avoiding communication over said first channel using a Tx sector of said first station, if detecting said second and third stations are engaged for communication over said first channel using the Tx sector of said second station; and
based on the indication of said Tx sector of said second station, using by said first station a second channel, different from said first channel, for communicating via the Tx sector of said first station.

20. The product of claim 19, wherein the instructions result in determining first beamforming information associating between a plurality of Tx sectors of said first station and Tx sectors of a first plurality of stations, and, based on beamforming frames communicated between second and third pluralities of stations, determining second beamforming information associating between Tx sectors of the second plurality of stations and the third plurality of stations.

21. The product of claim 19, wherein said beamforming frame comprises a Sector Sweep (SSW) frame including a SSW feedback field, said SSW feedback field including the indication of said Tx sector of said second station.

* * * * *